United States Patent

Tominaga et al.

Patent Number: 5,982,279
Date of Patent: Nov. 9, 1999

[54] TIRE AIR PRESSURE DETECTING DEVICE

[75] Inventors: Motonori Tominaga, Anjo; Yuuichi Inoue, Tajimi; Kenji Tomiita, Chita-gun; Shinjiro Fukada, Anjo; Yoshihiro Nishikawa, Kakogawa; Takaji Umeno, Aichi-gun; Hideki Ohashi, Toyota, all of Japan

[73] Assignees: Denso Corporation, Kariya; Nippon Soken, Inc., Nishio, both of Japan

[21] Appl. No.: 08/939,048

[22] Filed: Sep. 26, 1997

[30] Foreign Application Priority Data

Sep. 26, 1996 [JP] Japan .................................... 8-277469
Oct. 25, 1996 [JP] Japan .................................... 8-301344

[51] Int. Cl.$^6$ .................................................. B60C 23/00
[52] U.S. Cl. .......................... 340/444; 340/442; 340/443; 340/671; 340/672; 73/146; 73/146.2
[58] Field of Search ..................................... 340/442, 443, 340/671, 672; 701/36, 45, 47; 73/146, 146.2

[56] References Cited

U.S. PATENT DOCUMENTS

| 5,497,657 | 3/1996 | Taguchi et al. ........................ 73/146.2 |
| 5,553,491 | 9/1996 | Naito et al. ............................ 73/146.5 |
| 5,557,552 | 9/1996 | Naito et al. ............................ 73/146.5 |
| 5,596,141 | 1/1997 | Nishikawa et al. .................... 73/146.2 |
| 5,801,305 | 9/1998 | Kawai et al. .......................... 73/146.2 |
| 5,826,207 | 10/1998 | Ohashi et al. ............................ 701/36 |

FOREIGN PATENT DOCUMENTS

| 63-305011 | 12/1988 | Japan . |
| 6-286430 | 10/1994 | Japan . |
| 6-297923 | 10/1994 | Japan . |
| 8-268013 | 10/1996 | Japan . |

*Primary Examiner*—Jeffery A. Hofsass
*Assistant Examiner*—Daryl C. Pope
*Attorney, Agent, or Firm*—Pillsbury Madison & Sutro LLP

[57] ABSTRACT

To accurately detect a resonance frequency of tire even in high speed range by which tire air pressure state of each wheel is known, a calculation processing unit to which detection signals of wheel speed and resonance frequencies of tire are inputted calculates a timewise change amount of a wheel speed deviation that is a difference between wheel speed ratios of front and rear wheels. Then, it makes corrections to remove the influence of timewise change amounts of resonance frequencies of front wheels from timewise change amounts of wheel speed deviations based on a relationship between the resonance frequency and the wheel speed deviation when air pressure of the tire is changed. The unit then converts the corrected timewise change amount of the rotational state into the timewise change amount of the resonance frequencies of the rear wheels based on the above-described relationship and the resonance frequencies of the rear wheels and the timewise change amounts of the resonance frequencies of the rear wheels which have been accurately detected before the vehicle speed exceeds an upper limit value.

16 Claims, 26 Drawing Sheets

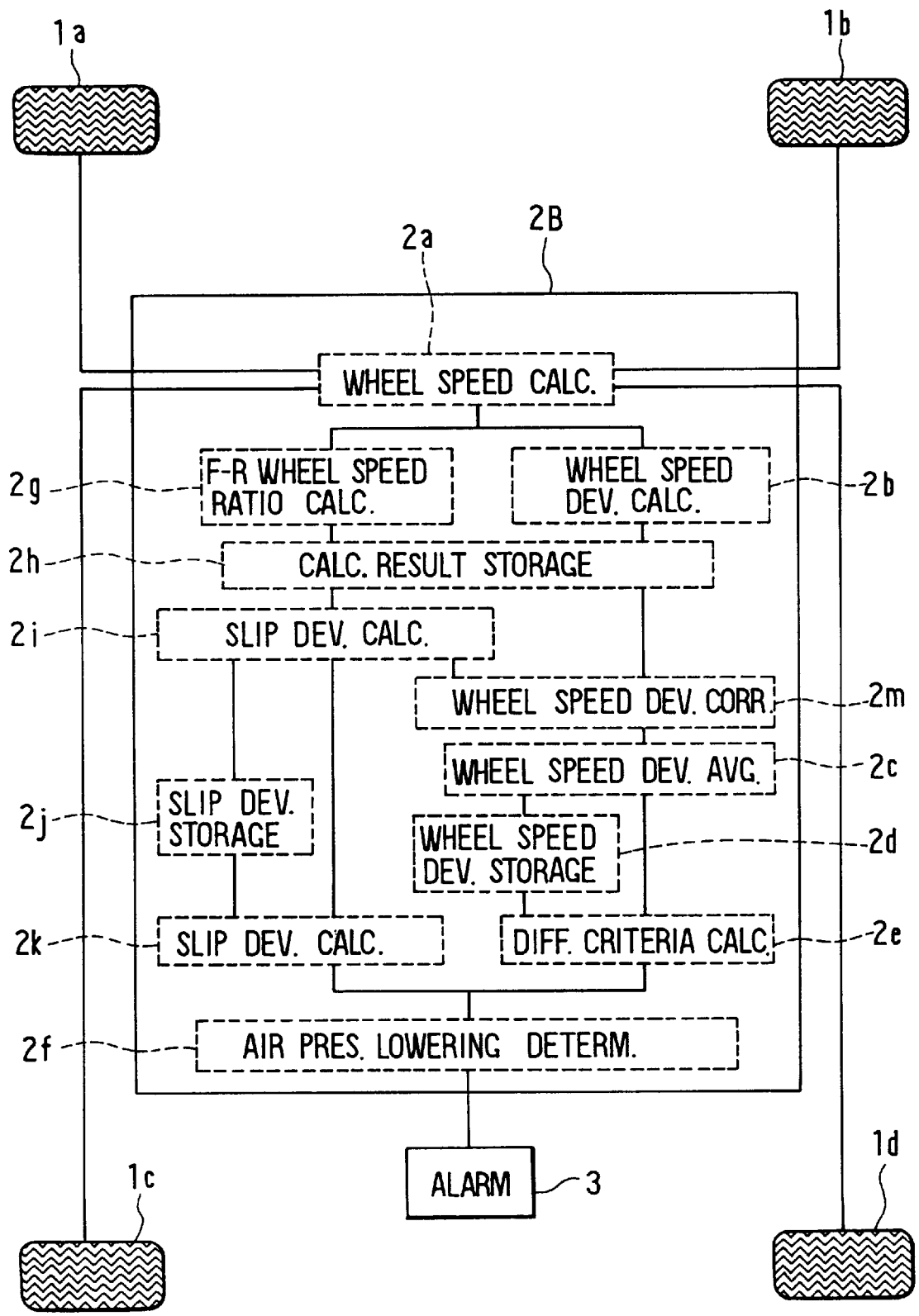

TIRE AIR PRESSURE DETECTING DEVICE

CROSS-REFERENCE TO RELATED APPLICATION

This application is related to Japanese Patent Application No. Hei 8-277469 and 8-301344, incorporated herein by reference.

BACKGROUND OF THE INVENTION

1. Field of the Invention

The present invention relates to a tire air pressure detecting device for detecting a state of tire air pressure such as puncture or the like in a vehicle.

2. Description of Related Art

As a device for detecting an air pressure in a vehicular tire, a device for directly detecting air pressure of a tire by monitoring the air pressure state of the tire when running a vehicle and informing a driver of the abnormality of tire such as flat tire or the like is known in the art. Also known in the art is a device for utilizing the resonance frequency of tire by paying attention to a correlation between the air pressure of tire and the resonance frequency of tire as disclosed in tire air pressure detecting device as described in Japanese Patent Application Laid-Open No. Hei 5-133831. According to this system, a spectrum (refer to FIG. 14) of vibration components of the wheel speed is provided by Fast Fourier Transformation (FFT) of the wheel speed by which the resonance frequency of tire is detected and as shown in FIG. 15, when the resonance frequency becomes lower than a predetermined value, it is determined that air leakage such as puncture or the like has occurred in the tire and an alarm is issued.

Further, Japanese Patent Application Laid-Open No. 63-305011 disclosed a method of reduced pressure detection in which the tire air pressure state (occurrence of puncture or the like) is detected not by absolute evaluation for detecting the tire air pressure based on the resonance frequency as in the first conventional example, but indirectly. According to the method of detecting a vehicular tire having reduced pressure, angular velocities of four wheels are detected, sums of angular velocities of two sets of wheels disposed on the diagonal lines are respectively calculated and when a difference between the sums is within a predetermined value, the angular velocities of the respective wheels are compared with an average value of the angular velocities of the four wheels, whereby lowering of the air pressure is evaluated.

Further, according to the method of detecting a vehicular tire having reduced pressure described in Japanese Patent Application Laid-Open No. 63-305011, attention is paid to the fact that when the air pressure of one of the tires attached to the wheels is lowered and the rotational radius of the wheel is decreased, the wheel speed is increased and the state of the air pressure of tire is indirectly detected by calculating a rotational state value based on angular velocities of front, rear, left and right wheels detected by wheel speed sensors or the like.

The rotational state value is a parameter depending on a deviation between a wheel speed deviation between left and right front wheels and a wheel speed deviation between left and right rear wheels such that the value is changed in accordance with the air pressure of the tire without being influenced by the wheel speed deviation between the left and right wheels when making a turn. The rotational state value shows an increase in the wheel speed of the right side drive wheel or the left side driven wheel or an increase in the wheel speed of the left side drive wheel or the right side driven wheel and specifies the two wheels having lowered tire air pressures.

However, according to the first conventional example, the wheel speed includes the resonance frequency of a tire as well as other resonance frequencies constituting noise and accordingly, whether the S/N ratio is excellent or not influences the detection accuracy of the tire air pressure. The S/N ratio deteriorates at a high speed range with respect to a drive wheel and the practical limit speed of the first conventional example is approximately 60–100 km/h.

According to the second conventional example, although the vehicle speed is not limited as in the first conventional example, only relative determination of one wheel can be performed and which of the diagonal two wheels is abnormal is not known.

Further, according to the technology using the rotational state value, it can be determined that only either ones of two wheels at diagonal positions (left front wheel and right rear wheel, right front wheel and left rear wheel) have lowered air pressure and the one of the wheels having lowered tire air pressure cannot be specified. Further, when the air pressure of tire of a drive wheel is lowered, its detection certainty is not sufficient.

SUMMARY OF THE INVENTION

In view of the above problems of the prior art, an object of the present invention is to provide a tire air pressure detecting device capable of performing absolute evaluation on a tire air pressure state even in high speed range.

Another object of the present invention is to provide a tire air pressure detecting device capable of specifying a single one of a wheel having lowered tire air pressure.

Further, it is an object of the present invention to provide a tire air pressure detecting device having high detection certainty when air pressure of tire of a drive wheel is lowered.

The above objects are achieved according to a first aspect of the present invention by providing a tire pressure detecting system which includes a processing unit having a rotational state value calculating unit for calculating a rotational state value depending on a deviational difference between a wheel speed deviation between left and right drive wheels and a wheel speed deviation between left and right driven wheels detected by wheel speed detecting means, a front to rear wheel speed deviation calculating unit for calculating the wheel speed deviation between front and rear wheels, a regression calculating unit for calculating an inclination of a regression straight line of the rotational state value and the front to rear wheel speed deviation, and an air pressure lowering determining unit for specifying wheels having lowered tire air pressures to two wheels at diagonal positions among four wheels by a positiveness or a negativeness of the rotational state value, determining the wheel having lowered tire air pressure as the driven wheel when the inclination is recognized as zero and determining the wheel having lowered tire air pressure as the drive wheel when the inclination is not recognized as zero.

The above objects are achieved according to a second aspect of the present invention by providing a tire pressure detection system including a calculation processing unit to which detection signals of wheel speed and resonance frequencies of tire are inputted calculates a timewise change amount of a wheel speed deviation that is a difference between wheel speed ratios of front and rear wheels. Then, it makes corrections to remove the influence of timewise change amounts of resonance frequencies of front wheels from timewise change amounts of wheel speed deviations based on a relationship between the resonance frequency and the wheel speed deviation when air pressure of the tire is changed. The unit then converts the corrected timewise change amount of the rotational state into the timewise change amount of the resonance frequencies of the rear wheels based on the above-described relationship and the resonance frequencies of the rear wheels and the timewise change amounts of the resonance frequencies of the rear wheels which have been accurately detected before the vehicle speed exceeds an upper limit value.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIG. 27 is a block diagram of a tire air pressure detecting device according to a sixth preferred embodiment of the present invention.

DETAILED DESCRIPTION OF THE PRESENTLY PREFERRED EXEMPLARY EMBODIMENTS

Figure 1:
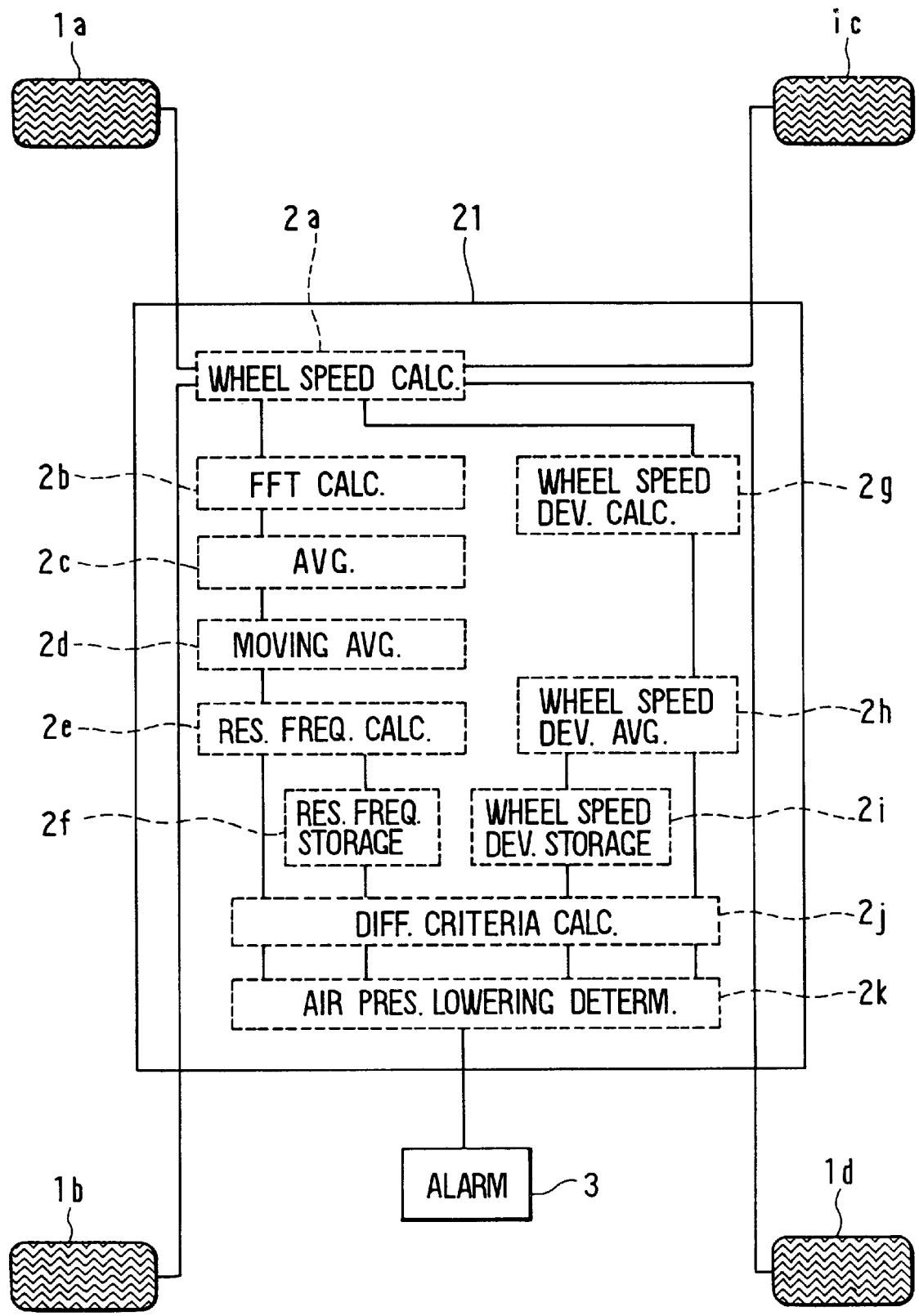
FIG. 1 is a block diagram of an tire air pressure detecting device according to a first preferred embodiment of the present invention.

FIG. 1 shows a tire air pressure detecting device according to a first embodiment of the present invention. A vehicle mounted with a tire air pressure detecting device is an FR vehicle where an engine is mounted in an engine compartment at the front portion of the vehicle and rear wheels are drive wheels. The tire air pressure detecting device is constituted by vehicle speed sensors $1a$, $1b$, $1c$ and $1d$ which implement vehicle speed detecting means provided in correspondence with the respective tires of the vehicle, a calculation processing unit 2 having inputs of signals from the vehicle speed sensors $1a$–$1d$ and an alarm device 3 for alarming lowering of air pressure of tire to a driver when an alarm signal is issued from the calculation processing unit 2. Two of the vehicle speed sensors $1a$–$1d$ (for example, $1a$, $1b$) correspond to the front wheels and the remaining two (for example, $1c$, $1d$) correspond to the rear wheels.

The calculation processing unit 2 is implemented by a microprocessor or the like and determination of tire air pressure state is executed based on software of the calculation processing unit 2 based on pulse signals from the wheel speed sensors $1a$–$1d$. In respect of the functional constitution of the calculation processing unit 2, data of wheel speeds inputted from the wheel speed sensors $1a$–$1d$ as pulse signals are inputted to a pressure difference criteria calculating unit $2j$ and a resonance frequency storing unit $2f$ via a wheel speed calculating unit $2a$, an FFT calculating unit $2b$, an averaging unit $2c$, a moving average unit $2d$ and a resonance frequency calculating unit $2e$. The data of wheel speeds are inputted from the wheel speed calculating unit $2a$ also to the pressure difference criteria calculating unit $2j$ and a wheel speed deviation storing unit $2i$ via a wheel speed deviation calculating unit $2g$ and a wheel speed deviation averaging unit $2h$. The resonance frequency storing unit $2f$ and the wheel speed deviation storing unit $2i$ are implemented by memories of the microcomputer. Data read from the resonance frequency storing unit $2f$ and the wheel speed deviation storing unit $2i$ as well as data from the resonance frequency calculating unit $2e$ and the wheel deviation averaging unit $2h$ are processed by the pressure difference criteria calculating unit $2j$ and an air pressure lowering determining unit $2k$ and formed into data for determining tire air pressure state and outputted to the alarm device 3.

Figure 2:
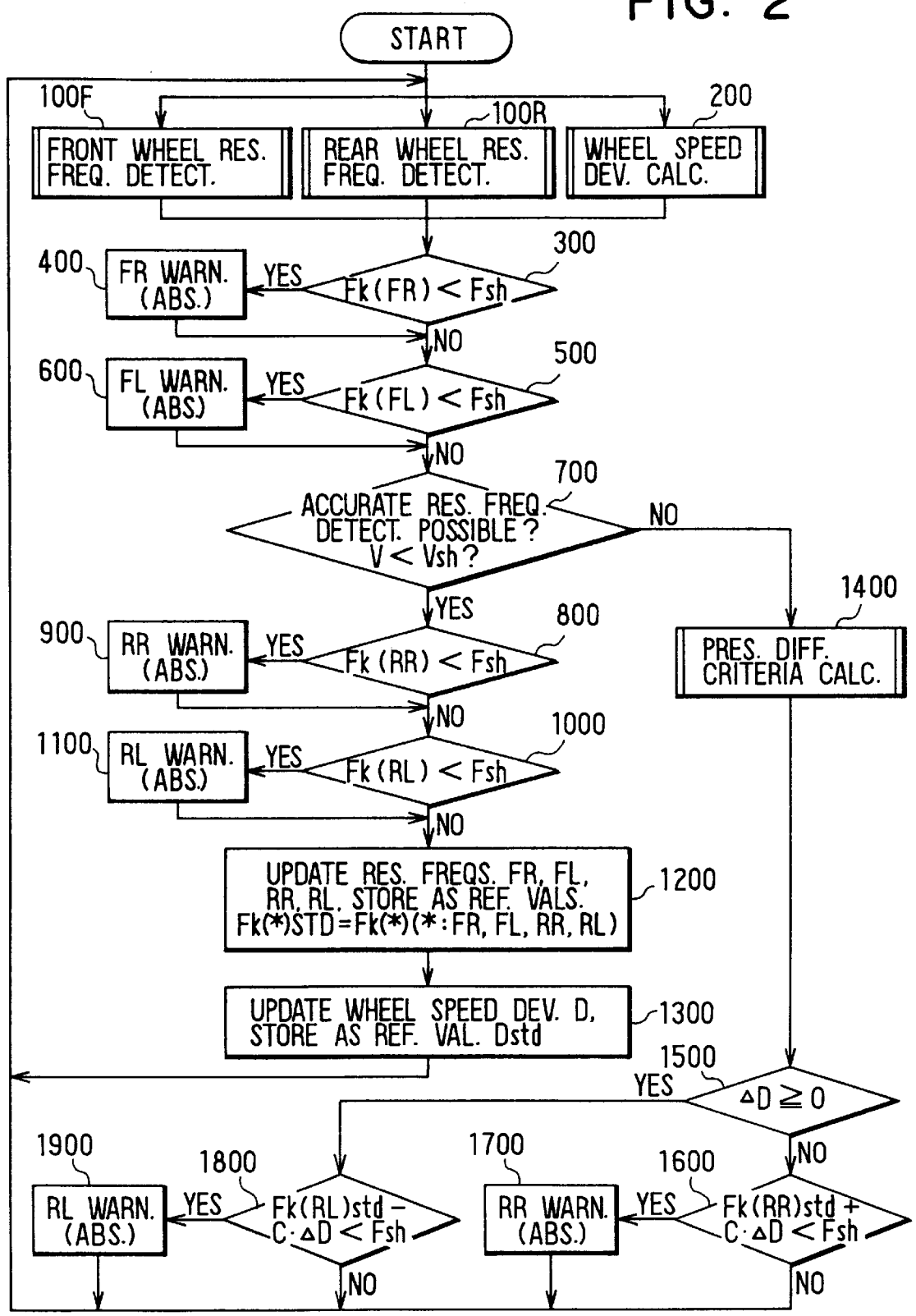
FIGS. 2–5 are flowcharts of the operation of the first embodiment.

FIG. 2 shows a flow of a main routine from wheel speed calculation to alarming of air pressure lowering executed in the calculation processing unit 2. Steps 100F and 100R designate a front wheel resonance frequency detecting subroutine and a rear wheel resonance frequency detecting subroutine where resonance frequencies are sampled based on front wheel speeds and rear wheel speeds, respectively. In Step 200, a wheel speed deviation D is calculated based on the four wheel speeds. The wheel speed deviation D is given as a function of wheel speeds of front, rear, left and right wheels detected by the wheel speed sensors $1a$–$1d$ and details of the calculation will be given later.

Figure 3:
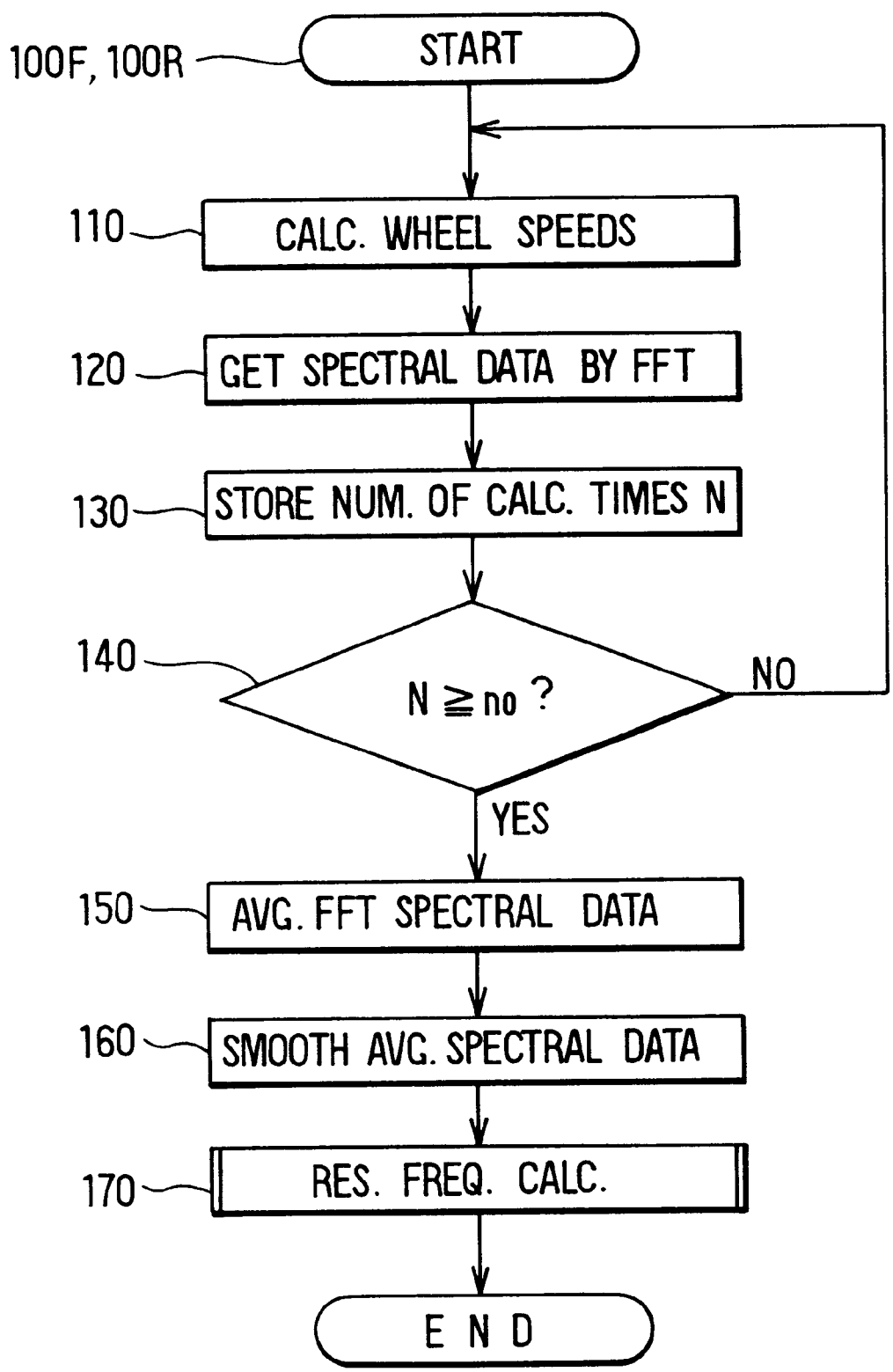

FIG. 3 shows a flow of the resonance frequency calculating subroutine and the same flow is used for the front wheels and the rear wheels. At Step 110, by operating the wheel speed calculating unit 2a constituting the wheel speed detecting means along with the wheel speed sensors 1a–1d, the wheel speeds of the respective wheels are calculated from numbers of pulse signals from the respective wheel speed sensors 1a–1d for inputting signals, for example, within 5 ms.

Steps 120–170 designate operation of the resonance frequency sampling means. At Step 120, spectrum data is obtained by performing FFT calculation with respect to the wheel speeds of the respective wheels by operating the FFT calculating unit. Respective component values of the spectrum data are given at discrete frequencies having a resolution $F_{lsb}$ (Hz). Next, a number of calculation times counter N is incremented by 1 and the result is temporarily stored in a hold memory B(N) (Step 130).

Next, at Step 140, the number of calculation times counter N is compared with a predetermined value $n_0$. If $N<n_0$, the operation returns to Step 110. If $N \geq n_0$, that is, when the FFT calculation (Step 120) has been performed $n_0$ times with respect to the vehicle speeds, the operation proceeds to Step 150.

At Step 150, by operating the averaging unit 2c, the result of the FFT calculation of $n_0$ times is read from the result hold memory B(N) and averaged. The reason is that shape (size or height) of irregularities present on a road surface is not constant and the result of the FFT calculation includes a random variation, which is to be removed. At Step 160, by operating the moving averaging unit 2d, smoothing is performed by the moving average of the spectrum data that has been averaged at Step 150 by which high frequency components are previously removed and detection accuracy of the resonance frequency is promoted.

Step 170 designates the resonance frequency calculation subroutine in accordance with the gravitational center method by operating the resonance frequency calculating unit 2e. The resonance frequency is determined by the center of gravity method from the smoothed spectrum data.

Figure 4:
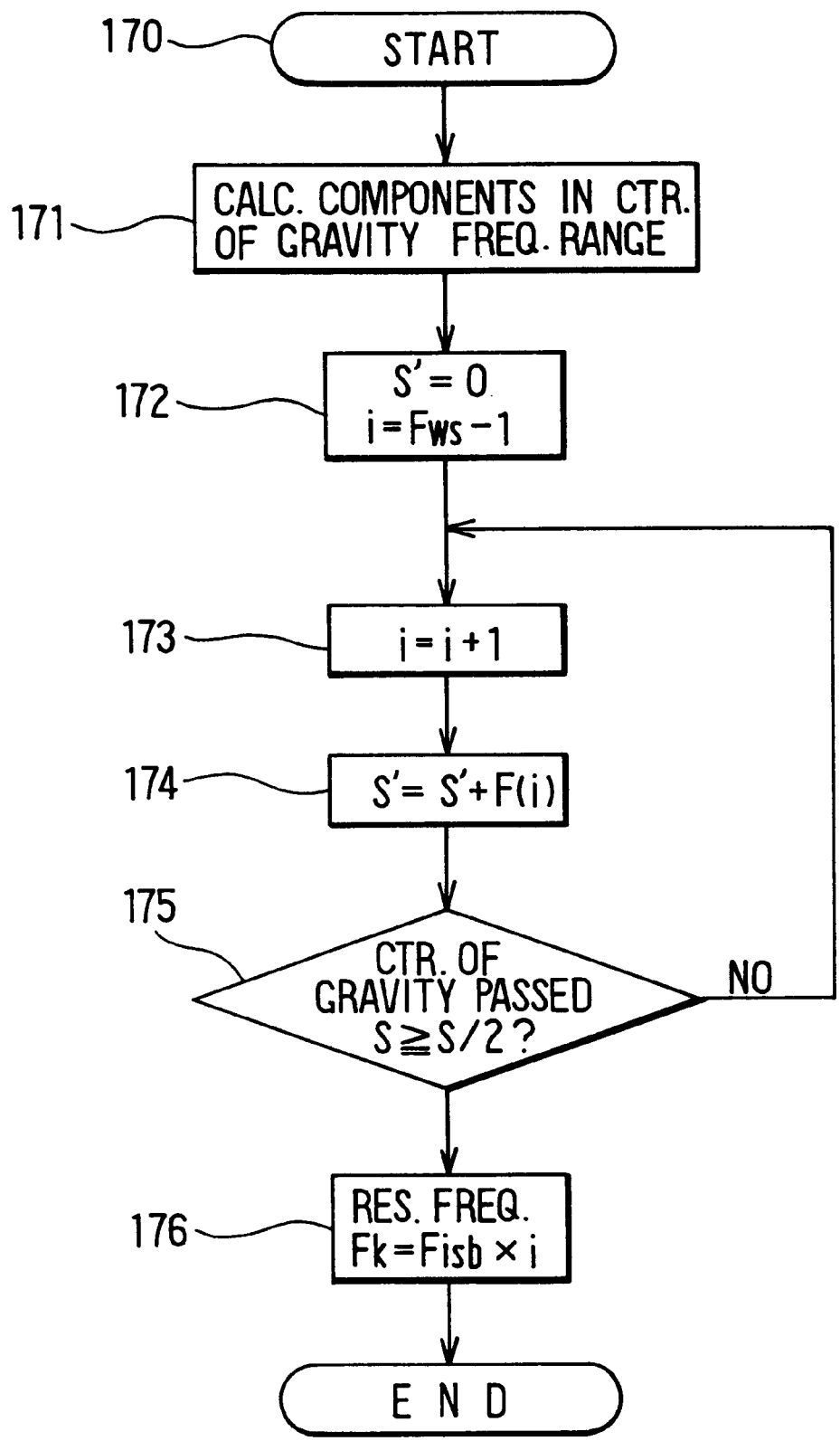

FIG. 4 shows detailed procedure of the resonance frequency calculation subroutine by the gravitational center method. First, at Step 171, a total sum S of component values F(i) is calculated from Equation (1) with respect to a frequency range to which the gravitational center method is applied. Here, notation i designates an index in correspondence with frequency and the frequency range to which the gravitational center method is applied is $i=F_{ws}$ through $F_{we}$.

$$S = \sum_{i=F_{ws}}^{F_{we}} F(i) \tag{1}$$

At Step 172, S' is reset to 0 and i is set to $F_{ws}-1$. Next, i is incremented by 1 (Step 173) and S' is updated by adding F(i) (Step 174). At Step 174, S' is compared with S/2. Steps 173–175 are repeated until S' reaches S/2 and i at that time corresponds to the frequency constituting the gravitational center of the component value. The resonance frequency $F_k$ is obtained by multiplying the resolution $F_{lsb}$ to i provided as described above (Step 176). Hereinafter, the resonance frequencies are represented by $F_k$ (FR) for right front wheel, $F_k$ (FL) for left front wheel, $F_k$ (RR) for right rear wheel and $F_k$ (RL) for left rear wheel.

Figure 5:
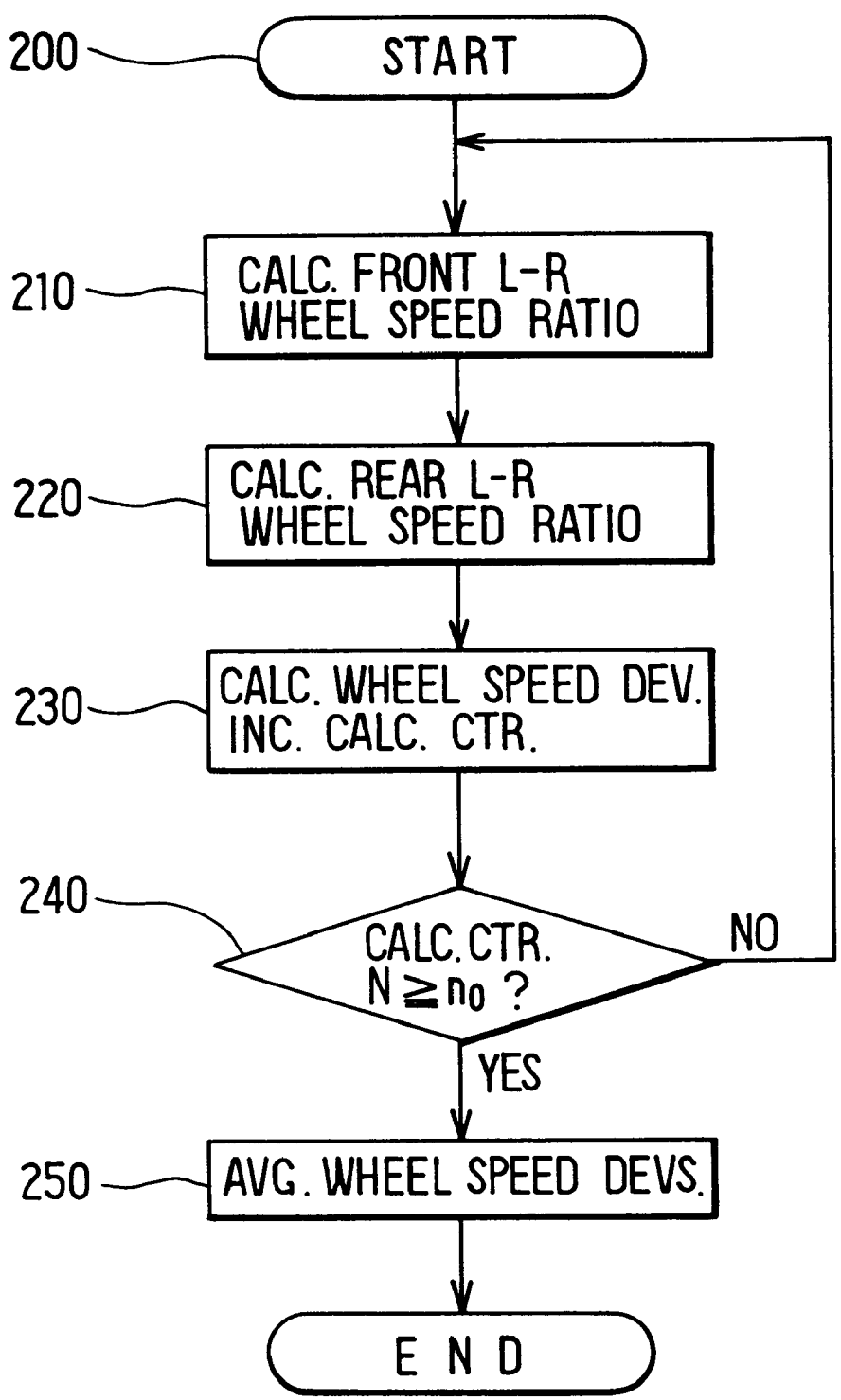

FIG. 5 shows the wheel speed deviation calculating subroutine at Step 200 (FIG. 2). The wheel speed deviation calculating subroutine constitutes the operational unit of the rotational state value calculating means. At Steps 210–230, by operating the wheel speed deviation calculating unit 2g, ratios $F_d$ and $R_d$ of right wheel to left wheel with respect to the detected wheel speeds which are deviations, are calculated by Equations (2) and (3) (Steps 210, 220) and from these a wheel speed deviation D that is the rotational state value is calculated by Equation (4) and a number of calculation times counter N is incremented by 1 (Step 230).

$$F_d = \frac{FR}{FL} \tag{2}$$

$$R_d = \frac{RR}{RL} \tag{3}$$

$$D = \frac{F_d}{R_d} \tag{4}$$

At Step 240, the number of calculation times counter N is compared with a predetermined number $n_0$. If $N<n_0$, the operation returns to Step 210. If $N \geq n_0$, that is, when the calculation of the wheel speed deviation D (Steps 210–230) has been performed $n_0$ times, the operation proceeds to Step 250.

At Step 250, by operating the wheel speed deviation averaging unit 2i, $n_0$ of the temporarily stored wheel speed deviations D are averaged and the operation returns to the main routine (FIG. 2). Incidentally, the average value of the wheel speed deviations D is also referred to as the wheel speed deviation D.

Figure 6:
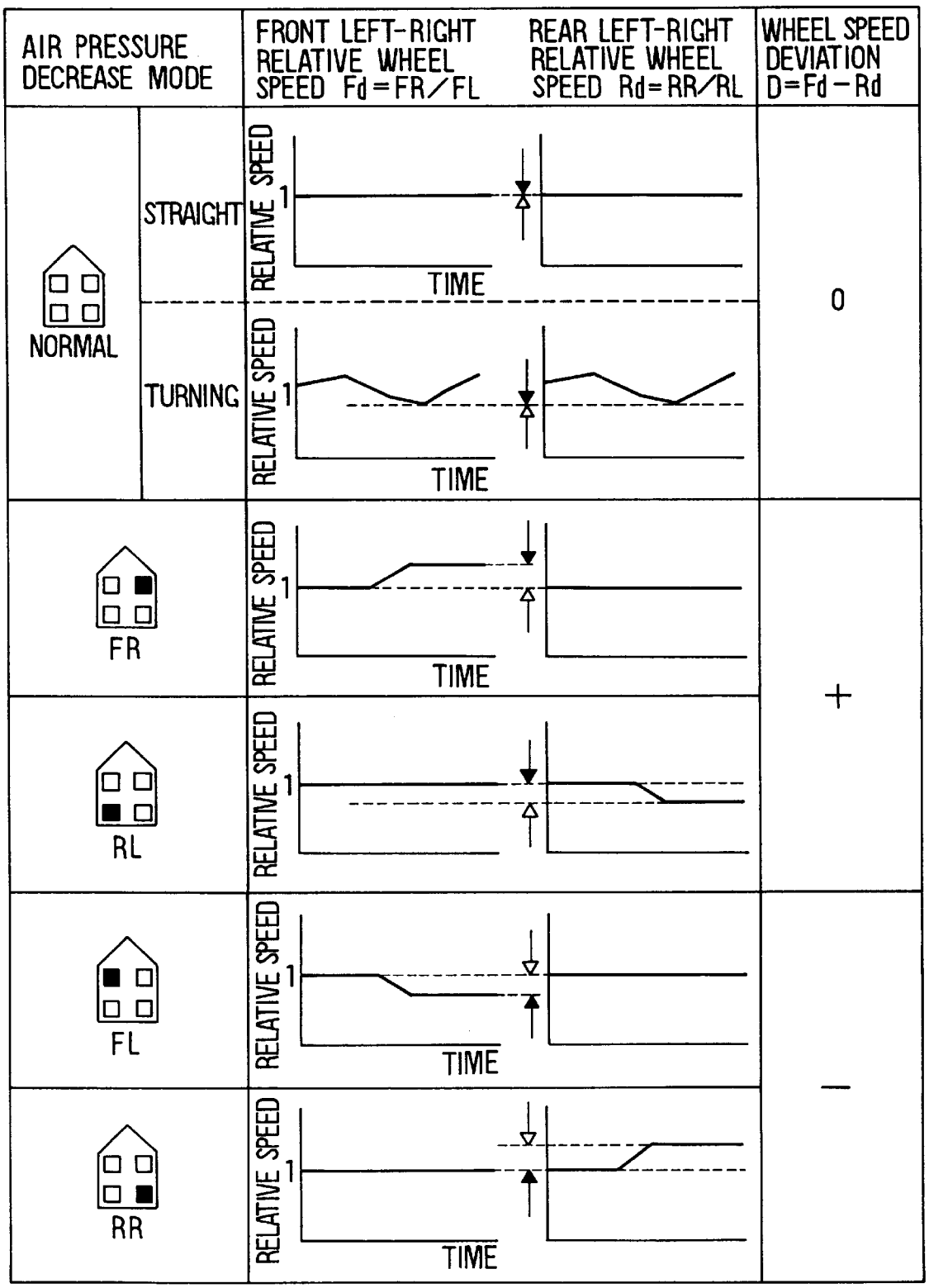
FIG. 6 is a diagram of the operation of the first embodiment.

FIG. 6 is a chart explaining behavior of the wheel speed deviation D. When the tire air pressures of all the wheels are normal and the vehicle is running on a straight line, the wheel speeds of the four wheels are equal to each other and therefore, either the left and right wheel speed ratio $F_d$ of the front wheel and the left and right wheel speed ratio $R_d$ of the rear wheel are 1 and the wheel speed deviation D is 0. Further, in making a curve, the radii of curves are different between the left front wheel and the right front wheel and therefore, the left and right wheel speed ratio $F_d$ of the front wheel increases or decreases centering on 1 depending on the directions of the curve. Meanwhile, the rear wheels show a behavior the same as that of the front wheels especially in a high speed range and the left and right wheel speed ratio $R_d$ of the rear wheel is equal to the left and right wheel speed ratio $F_d$ of the front wheel. Accordingly, with respect to the wheel speed deviation D, changes of the left and right wheel speed ratios $F_d$ and $R_d$ in making a curve cancel each other and the deviation stays the same irrespective of linear running or curved running.

Next, when, for example, tire air pressure of the right front wheel is lowered, the wheel speed is increased with lowering of the air pressure and accordingly, even in linear running, the left and right wheel speed ratio Fd of the front wheel is increased. Meanwhile, the wheel speeds of the left and right rear wheels are equal to each other and therefore, the left and right wheel speed ratio $R_d$ stays at 1. Accordingly, the wheel speed deviation D is changed to the positive side in correspondence with the amount of lowering of the tire air pressure. The wheel speed deviation D is changed similarly when the tire air pressure of the other wheel is lowered and when the tire air pressure of left front wheel or the right rear wheel is lowered, the wheel speed deviation D has a negative value.

After calculating the resonance frequencies $F_k$ (FR), $F_k$ (FL), $F_k$ (RR), $F_k$ (RL) and the wheel speed deviation D at Steps 100 and 200, the operation proceeds to Step 300.

Steps 300–1100 show operation of a portion of the air pressure lowering determining unit 2k that is the determining means. At Steps 300 and 500, the resonance frequencies $F_k$ (FR) and $F_k$ (FL) of the front wheels are respectively compared with a threshold value $F_{sh}$. The threshold value $F_{sh}$ is set to a resonance frequency number at an air pressure recognized as probably flat tire. When the resonance frequency $F_k$ (FR) and $F_k$ (FL) of the front wheels exceed $F_{sh}$, an alarm signal is outputted to the alarm device 3 (Steps 400, 600). According to the alarm signal, an amount of lowering air pressure is outputted in a numerical value and a driver can perform absolute evaluation of the lowering of air pressure in a numerical value by using the alarm device 3.

Next, the vehicle speed V is compared with a limit speed $V_{sh}$ that is an upper limit value (Step 700), and when the vehicle speed V is equal to or lower than the limit speed $V_{sh}$, the detection accuracy of the resonance frequency is determined to be non problematic, the resonance frequencies $F_k$ (RR) and $F_k$ (RL) of the rear wheels are respectively compared with the predetermined value $F_{sh}$ (Steps 800, 1000) and when they exceed $F_{sh}$, an alarm signal is outputted to the alarm device 3 (Steps 900, 1100). The limit speed $V_{sh}$ is set based on the detection accuracy or the like of the resonance frequencies $F_k$ (RR) and $F_k$ (RL) of the rear wheels in Step 100R.

Next, at Step 1200, by operating the resonance frequency storing unit 2f, the resonance frequencies $F_k$ (FR), $F_k$ (FL), $F_k$ (RR) and $F_k$ (RL) of the respective wheels calculated at Steps 100F and 100R used in determining the lowering of air pressure, are updated and stored as reference values $F_k$(*)std (here, *: FR, RL, RR, RL), respectively.

At Step 1300, by operating the wheel speed deviation storing unit 2i, the wheel speed deviation D calculated at Step 200 is updated and stored as a reference value $D_{std}$.

When the vehicle speed V is equal to or higher than the limit speed $V_{sh}$ at Step 700, the operation proceeds to Step 1400. Step 1400 designates a pressure difference criteria calculating subroutine which is operated by the pressure difference criteria calculating unit 2g.

Figure 7:
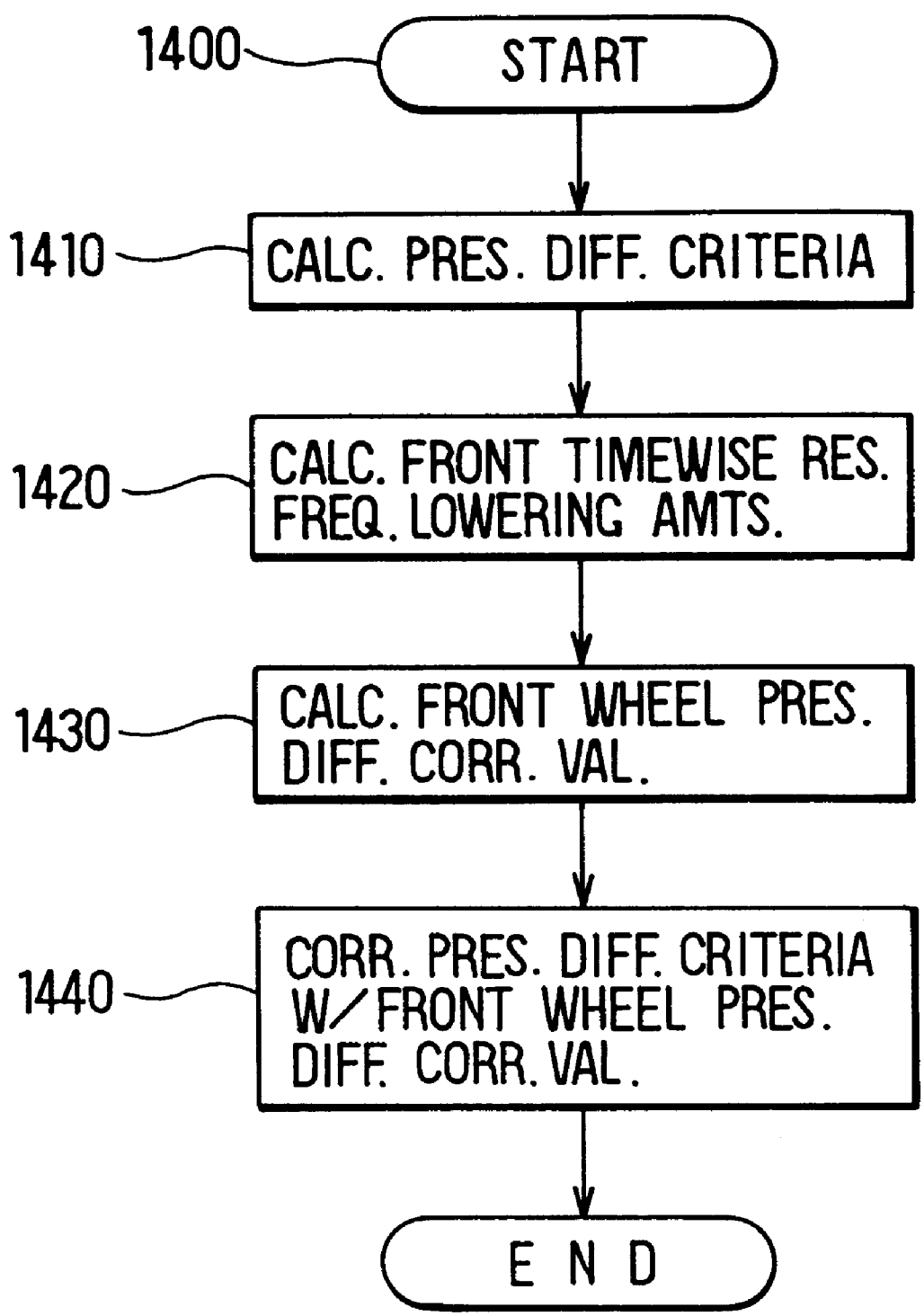
FIG. 7 is another flowchart of the operation of the first embodiment.

FIG. 7 shows a detailed flow of the pressure difference criteria calculating subroutine. At Step 1410, by operating a rotational state change amount calculating means, the reference value $D_{std}$ stored in the memory is read and a pressure difference criteria $\Delta D'$ is calculated by Equation (5):

$$\Delta D' = D - D_{std} \quad (5)$$

At Step 1420, by operating a resonance frequency change amount calculating means, timewise lowering amounts of the resonance frequencies of the front wheels are calculated by Equation (6) and Equation (7):

$$\Delta F_k(FR) = F_k(FR)_{std} - F_k(FR) \quad (6)$$

$$\Delta F_k(FL) = F_k(FL)_{std} - F_k(FL) \quad (7)$$

At Steps 1430 and 1440, a correcting means is operated and at Step 1430, a front wheel pressure difference correction value FDC is calculated by Equation (8). In Equation (8), coefficient C is a coefficient for converting the resonance frequency into the wheel speed deviation when tire air pressure is lowered and is stored in the memory as the storing means. The coefficient C is calculated previously by experiments or the like simulating an actual running state. For example, if the pressure difference criteria is 5/1000 and the lowering amount of the resonance frequency is 8 Hz when, for example, tire air pressure is lowered by 100 kPa, C is 1600.

$$FDC = \frac{\Delta F_k(FR) - \Delta F_k(FL)}{C} \quad (8)$$

The right-hand side of Equation (8) represents an amount of change in the deviation between the wheel speeds of the left and right front wheels caused by a difference in tire air pressures of the left and right front wheels and when the air pressure lowering of tire of the right front wheel is larger, the amount becomes positive and when the air pressure lowering of tire of the left front wheel is larger, the amount becomes negative.

Next, the pressure difference criteria $\Delta D'$ is corrected by Equation (9) using the front wheel pressure difference correction value FDC (Step 1440). In Equation (9), _D designates the pressure difference criteria after correction.

$$\Delta D = \Delta D' - FDC \quad (9)$$

As mentioned above, the pressure difference correction value FDC represents the amount of change in the deviation of the wheel speeds between the left and right front wheels caused by the tire air pressure difference between the left and right front wheels and accordingly, the pressure difference criteria after correction $\Delta D$ depends only on the change in the tire air pressures of the rear wheels.

Steps 1500–1900 show other operations of the air pressure lowering determining unit 2k. At Step 1500, the degree of positiveness or negativeness of the pressure difference criteria $\Delta D$ is determined. As mentioned above, the pressure difference criteria $\Delta D$ depends only on the tire air pressures of the rear wheels and is provided with a negative value when the air pressure of tire of the right rear wheel is lowered and a positive value when the air pressure of tire of the left rear wheel is lowered. Further, when $\Delta D$ is negative, it is determined that the air pressure of tire of the right rear wheel is lowered and the operation proceeds to Step 1600.

The front half of Step 1600 is operated by a drive wheel resonance frequency estimating means and an amount of change in the resonance frequency of the right rear wheel caused by the lowering of the tire air pressure is calculated. The resonance frequency and the wheel speed deviation when the tire air pressure is lowered are converted by the above-mentioned coefficient C and therefore, the change amount of the resonance frequency is given by $C \cdot \Delta D$. The resonance frequency at the start point of change in the resonance frequency is the resonance frequency reference value $F_k(RR)_{std}$ stored in the memory. Further, when the pressure of tire of the right rear wheel is lowered, $\Delta D$ is provided with a negative value. Further, the resonance frequency reference value $F_k(RR)_{std}$ is read from the memory and the resonance frequency of the right rear wheel is estimated as $F_k(RR)_{std} + C \cdot \Delta D$.

The rear half of Step 1600 is operated by the remaining portion of the air pressure lowering determining unit 2k and the estimated resonance frequency is compared with the predetermined value $F_{sh}$ and if the estimated resonance frequency exceeds $F_{sh}$, an alarm signal is issued to the alarm device 3 (Step 1700). With respect to the alarm signal, similar to the case of the low speed range where the vehicle speed V does not exceed the limit speed $V_{sh}$, based on the estimated resonance frequency, the amount of lowering the air pressure is outputted as a numerical value.

Further, if the pressure difference criteria $\Delta D$ is positive, it is determined that the air pressure of tire of the left rear wheel is lowered and the operation proceeds to Step 1800. At Step 1800, the procedure at Step 1600 is substantially executed by replacing the right rear wheel by the left rear wheel and when the air pressure of tire of the left rear wheel is lowered, $\Delta D$ is provided with a negative value and therefore, the resonance frequency of the left rear wheel is estimated as $F_k(RL)_{std}-C\cdot\Delta D$. If the estimated value of the resonance frequency of the left rear wheel exceeds $F_{sh}$, similar to the case of the right rear wheel (Step 1700), an alarm signal is outputted to the alarm device 3 (Step 1900).

Figure 8:
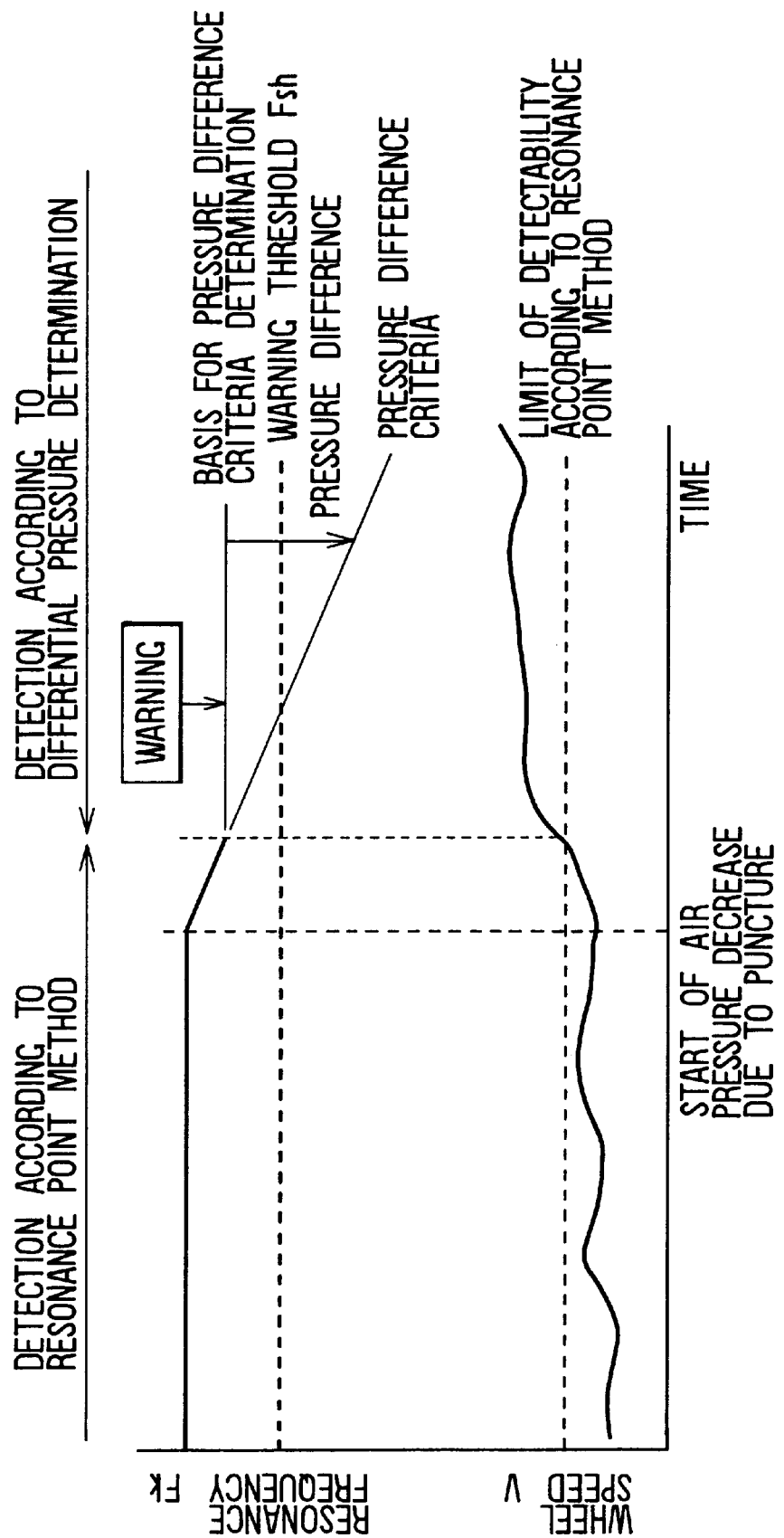
FIG. 8 is a graph of the operation of the first embodiment.

FIG. 8 shows timewise changes of the resonance frequency and the vehicle speed and when the tire air pressure is lowered by puncture or the like, the resonance frequency is also lowered. The resonance frequency is calculated by direct calculation before the vehicle speed V exceeds the limit speed $V_{sh}$, the resonance frequency is compared with the alarm threshold value $F_{sh}$ and abnormality of the air pressure state of the tire is alarmed (resonance point system). When the vehicle speed V exceeds the limit speed $V_{sh}$, with respect to the rear wheel, the last resonance frequency before exceeding the limit speed $V_{sh}$ is estimated based on the resonance frequency reference value and the pressure difference criteria $\Delta D$, the estimated resonance frequency is compared with the alarm threshold value $F_{sh}$ and abnormality of the air pressure state of the tire is alarmed.

(Second Embodiment)

Figure 9:
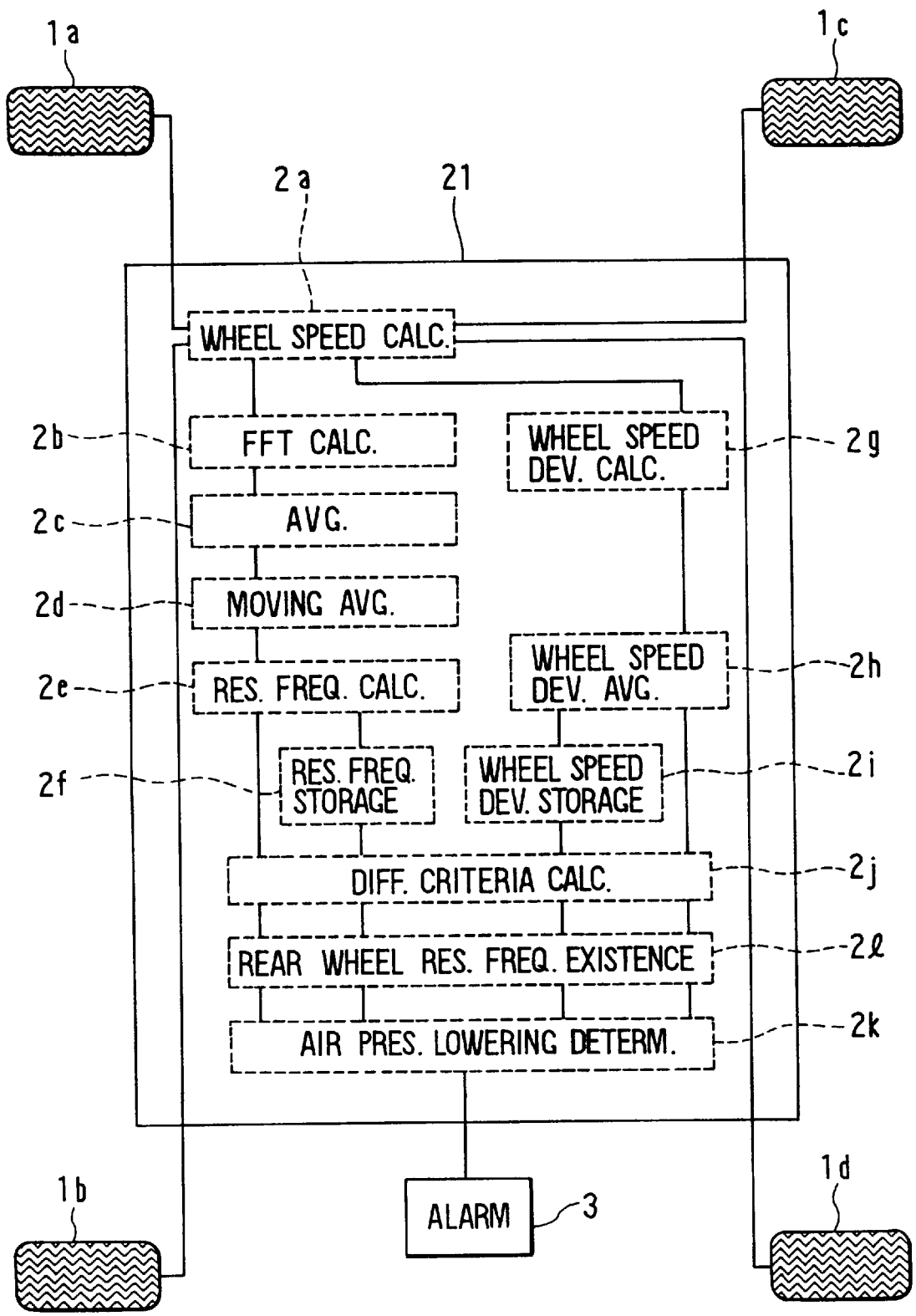
FIG. 9 is a block diagram of a tire air pressure detecting device according to a second preferred embodiment of the present invention.
Figure 10:
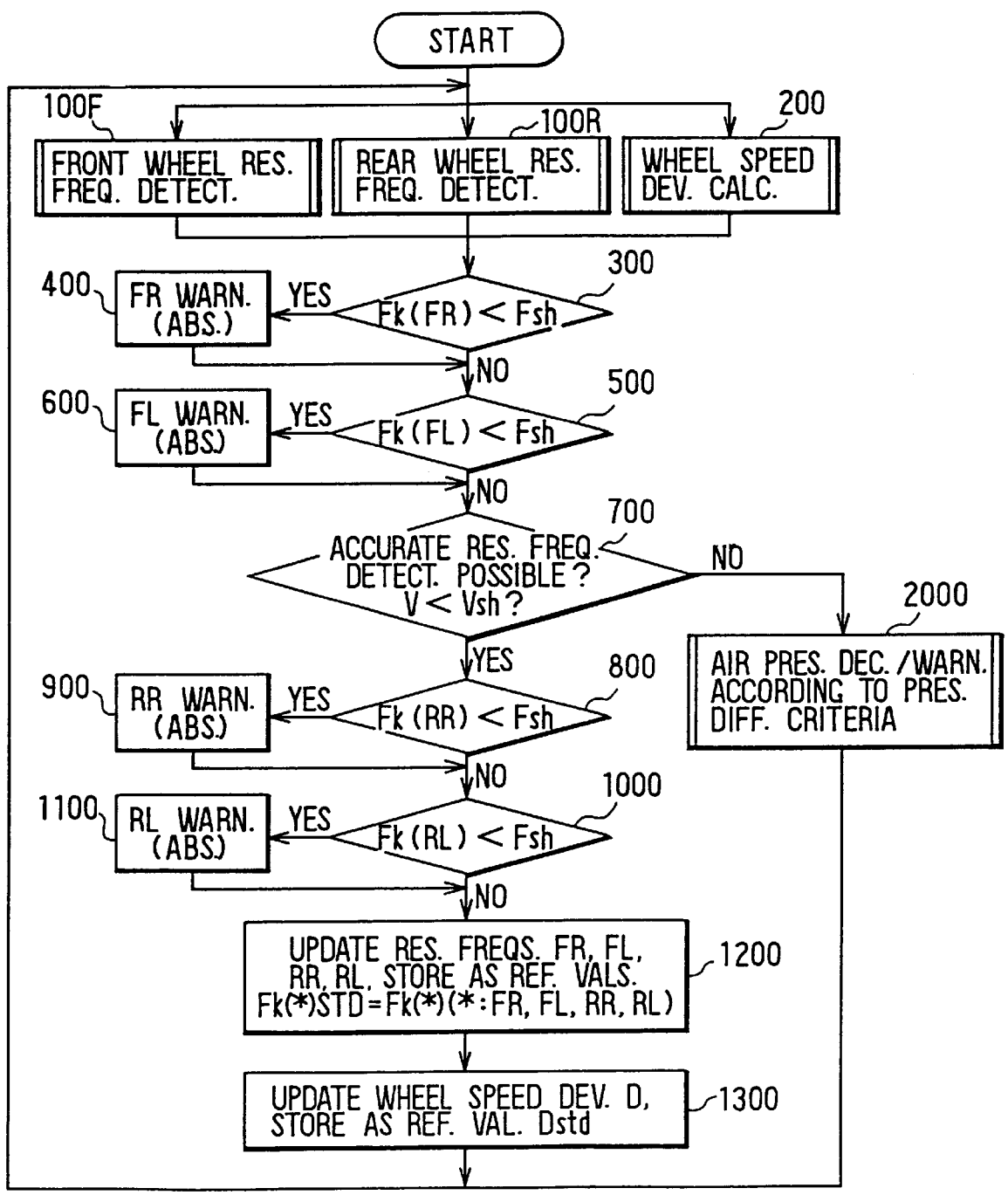
FIGS. 10 and 11 are flowcharts of the operation of the second tire air pressure detecting device according to the present invention.
Figure 11:
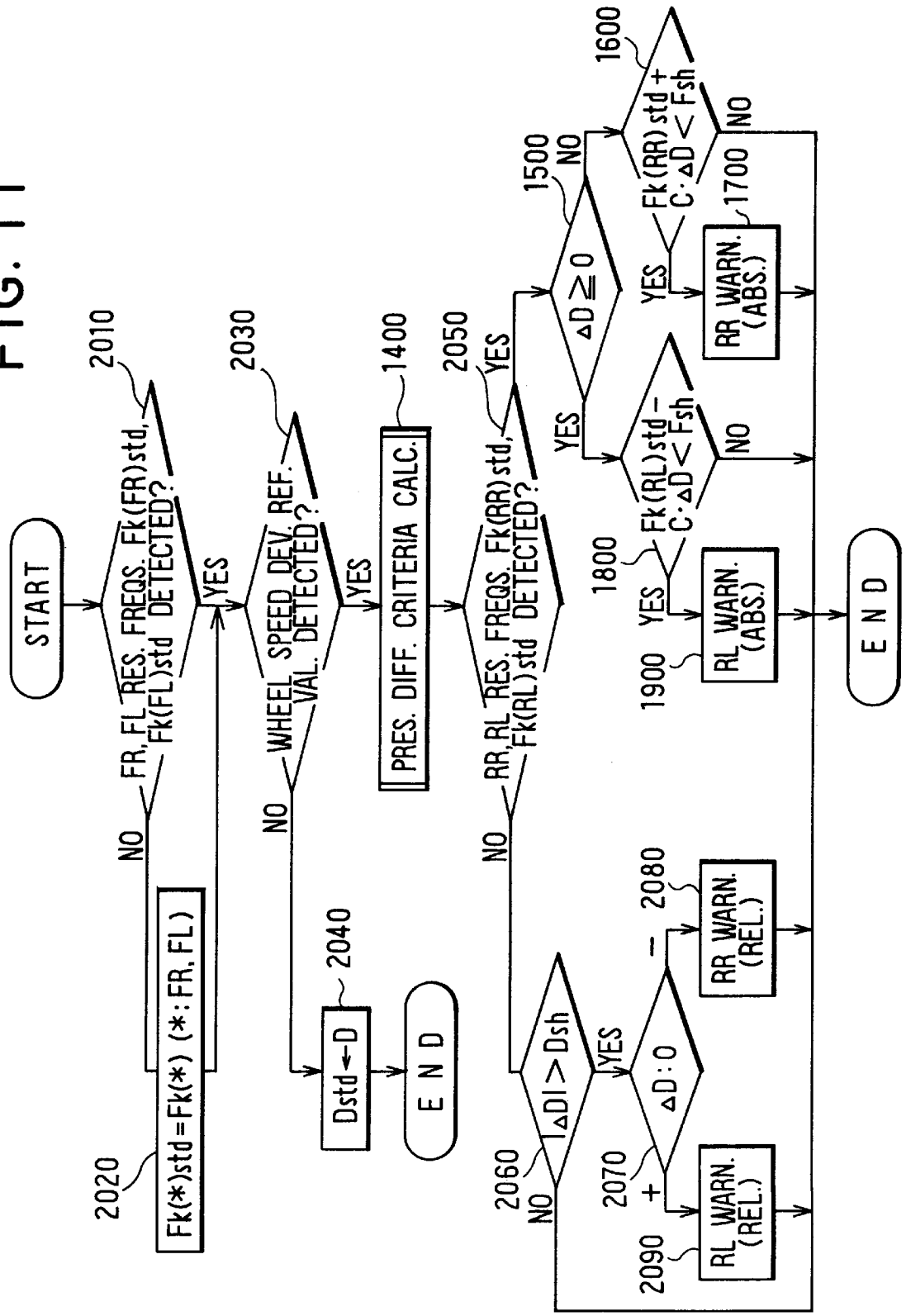

FIG. 9 shows a second preferred embodiment of the present invention. A rear wheel frequency existence determining unit 21 is provided between the pressure difference criteria calculating unit 2j and the air pressure lowering determining unit 2k in the first embodiment shown in FIG. 1 and the flow (Steps 1400–1900) when the vehicle speed V exceeds the limit speed $V_{sh}$ at Step 700 in FIG. 2 is changed to an air pressure lowering determining and alarming subroutine using the pressure difference criteria (FIG. 10). The air pressure lowering determining and alarming subroutine using the pressure difference criteria is shown in FIG. 11. In these drawings, steps denoted by the same numbers as in FIG. 3 in connection with the first embodiment are similar and therefore, an explanation will be given centering on differences thereof from the first embodiment.

In FIG. 11, at Step 2010, whether the resonance frequencies $F_k(FR)_{std}$ and $F_k(FL)_{std}$ of tires of the front wheels have been detected is determined and when they have not been detected, $F_k(FR)$ and $F_k(FL)$ calculated in Step 100F are determined as $F_k(FR)_{std}$ and $F_k(FL)_{std}$ (Step 2020).

Successively, whether the reference value $D_{std}$ of the wheel speed deviation has been detected is determined and when it has not been determined, the pressure difference criteria D calculated in Step 200 (FIG. 10) is determined as $D_{std}$ (Step 2040) and the main routine is finished.

When the reference value $D_{std}$ of the pressure difference criteria has been detected (Step 2030), the pressure difference criteria calculating subroutine (Step 1400) is executed similar to the first embodiment whereby the pressure difference criteria $\Delta D$ is obtained.

Next, at Step 2050, the rear wheel frequency existence determining unit 21 is operated, and whether the resonance frequencies $F_k(RR)_{std}$ and $F_k(RL)_{std}$ of tires of the rear wheels have been detected is determined. At a very early stage of immediately after running a vehicle, the resonance frequency reference values of the rear wheels necessary for estimating the resonance frequencies of the rear wheels have not yet been stored. Accordingly, when, for example, a vehicle is swiftly accelerated from a parking area or the like to a running lane and merges with the traffic and the vehicle speed V exceeds the limit vehicle speed $V_{sh}$, the resonance frequencies of the rear wheels before the vehicle speed V exceeds the limit vehicle speed $V_{sh}$, cannot be detected.

Hence, separate procedures are executed in the case where the resonance frequency reference values of the rear wheels are stored and in the case where they are not stored. When the resonance frequencies $F_k(RR)_{std}$ and $F_k(RL)_{std}$ of tires of the rear wheels have been detected, similar to the first embodiment, Steps 1500–1900 are executed.

When the resonance frequencies $F_k(RR)_{std}$ and $F_k(RL)_{std}$ of tires of the rear wheels have not been detected (Step 2050), at Step 2060, the magnitude $|\Delta D|$ of the pressure difference criteria $\Delta D$ is compared with the threshold value $D_{sh}$. The pressure difference criteria $\Delta D$ depends only on the change in the tire air pressure difference of the rear wheels and therefore, when either of the air pressures of tires of rear wheels is lowered, the pressure difference criteria $\Delta D$ is considerably deviated positively or negatively. The threshold value $D_{sh}$ is a value of the pressure difference criteria $\Delta D$ whereby the lowering of the air pressure can be determined and is stored in a memory of the calculation processing unit 2 by setting it previously by experiments or the like.

When $|\Delta D|$ is larger than $D_{sh}$, the sign of $\Delta D$ is determined (Step 2070). When the air pressure of the right rear wheel is lowered, the left to right rear wheel speed ratio $R_d$ is increased and the pressure difference criteria $\Delta D$ is negative. Accordingly, when the sign of the pressure difference criteria $\Delta D$ is negative, an alarm signal alarming the lowering of the air pressure of the right rear wheel is outputted to the alarm device 3 (Step 2080) and conversely, when the sign of the pressure difference criteria $\Delta D$ is positive, an alarm signal alarming the lowering of the air pressure of the left rear wheel is outputted to the alarm device 3 (Step 2090).

Incidentally, when $|\Delta D|$ is smaller than $D_{sh}$, the tire air pressure state is determined to be normal in Step 2060.

(Third Embodiment)

Figure 12:
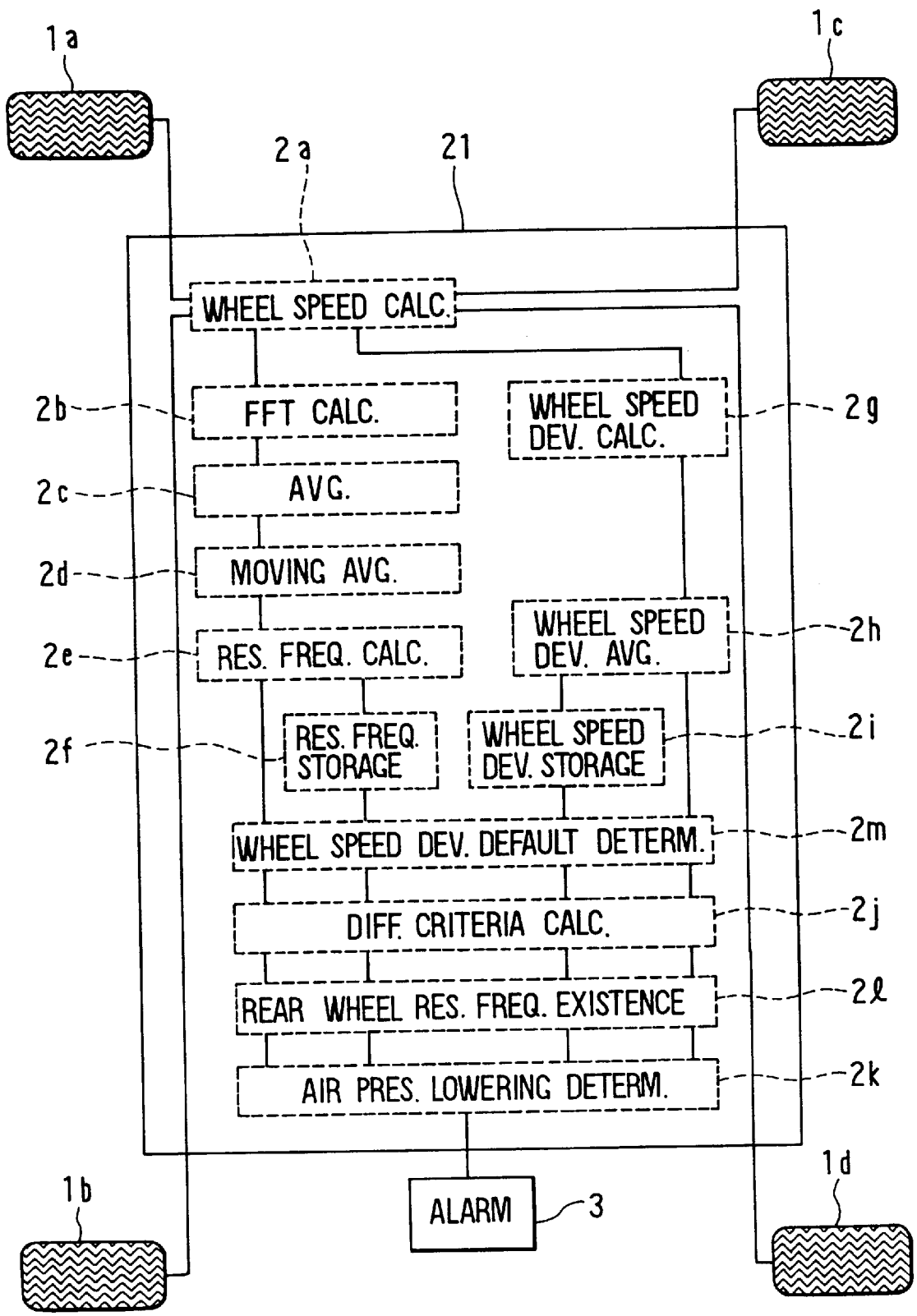
FIG. 12 is a block diagram of a tire air pressure detecting device according to a third preferred embodiment of the present invention.
Figure 13:
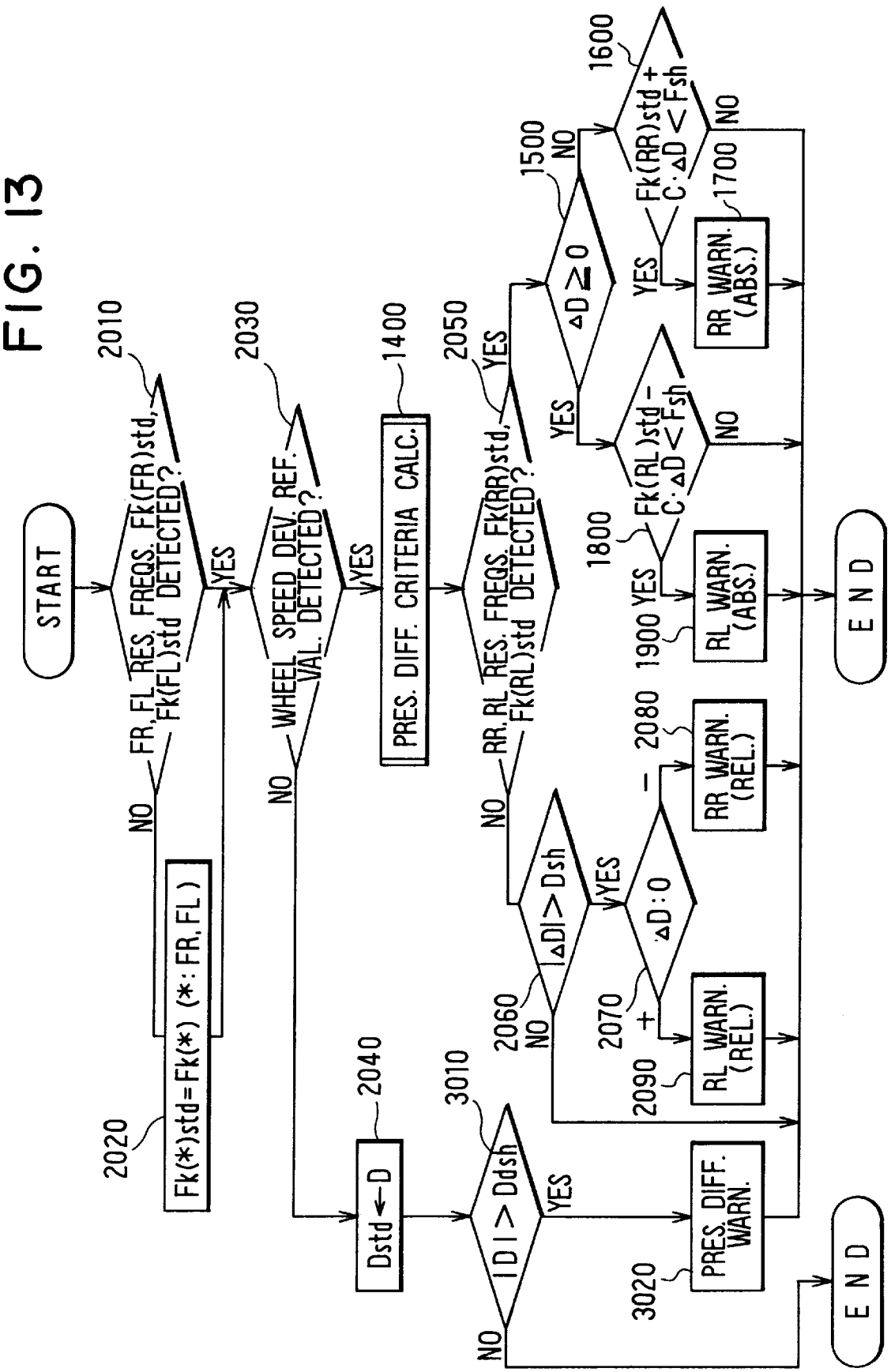
FIG. 13 is a flowchart of the operation of the third embodiment.
Figure 14:
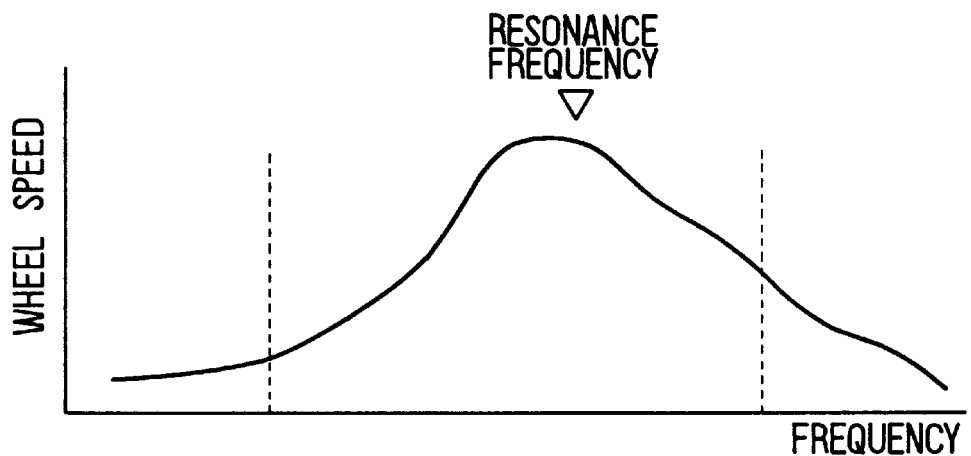
FIGS. 14 and 15 are graphs of the operation of a conventional tire air pressure detecting device.
Figure 15:
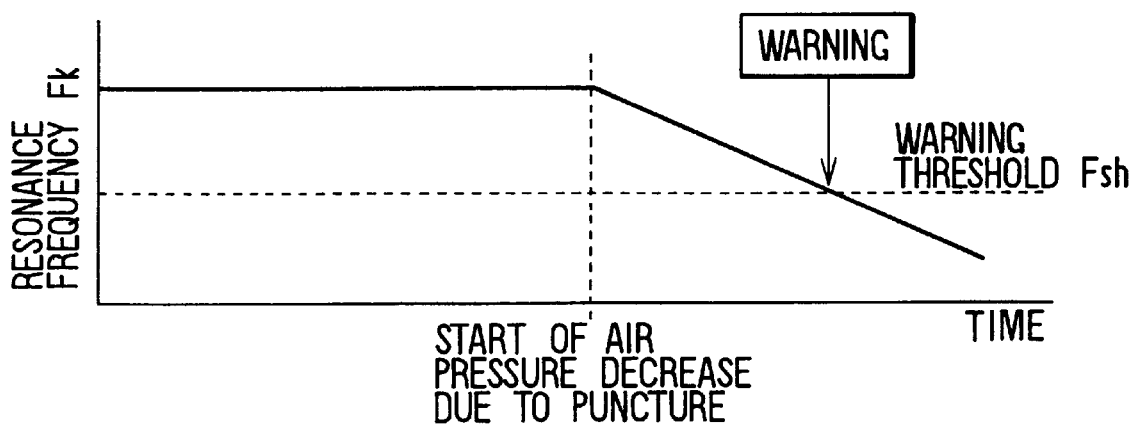

FIG. 12 shows a third preferred embodiment of the present invention. A wheel speed deviation default determining unit 2m is provided at the fore stage of the pressure difference criteria calculating unit 2j of the second embodiment shown in FIG. 9 and the air pressure lowering determining and alarming subroutine using the pressure difference criteria illustrated by FIG. 11 is changed to another air pressure lowering determining and alarming subroutine using the pressure difference criteria. The air pressure lowering determining and alarming subroutine using the pressure difference criteria is shown by FIG. 13. In FIG. 13, steps having the same numbers as in FIG. 11 described in explaining the second embodiment are similar and therefore, an explanation will be given centering on differences thereof from the second embodiment.

According to the tire air pressure detecting device of the second preferred embodiment, the pressure difference criteria $\Delta D$ is calculated even if a vehicle quickly accelerates from a parking area or the like to a running lane and merges the traffic and the vehicle speed V exceeds the limit vehicle speed $V_{sh}$ by which the resonance frequencies of the rear wheels cannot be sampled (Step 1400 in FIG. 11), whereby the tire air pressure states of the respective rear wheels can be determined. However, the pressure difference criteria $\Delta D$ needs data at two time points and accordingly, when a vehicle is swiftly accelerated from a parking area or the like to a running lane and merges with the traffic and the vehicle speed V exceeds the limit vehicle speed $V_{sh}$ while the air pressure of a certain tire is extremely low and a considerable vehicle speed deviation occurs, a time lag occurs until the first pressure difference criteria $\Delta D$ is calculated and even if puncture or the like is caused in the rear wheel, it cannot be known at an early stage.

Hence, according to the embodiment, in FIG. 13, when the reference value $D_{std}$ of the wheel speed deviation has not been detected (Step 2030), the wheel speed deviation D is determined to be the reference value $D_{std}$ (Step 2040) and thereafter, the magnitude |D| of the wheel speed deviation D is compared with a default value $D_{dsh}$ and when the magnitude |D| is larger than the default value $D_{dsh}$, an alarm signal is issued to the alarm device 3 (Step 3020). Thereby, even in the state where the pressure of tire of either one of the rear wheels is low from the start of running, abnormality of the air pressure state of tire can be known at an early stage even if the vehicle speed V exceeds the limit vehicle speed $V_{sh}$ immediately after starting to run the vehicle.

Incidentally, although the deviation of the rotational states of the left and right wheels is set to the wheel speed ratio in the above-described respective embodiments, a vehicle acceleration may be calculated, for example, from a difference between the wheel speeds at successive time points and the deviation of the rotational states of the left and right wheels may be determined as the wheel acceleration ratio.

Further, although the rotational state value is determined as the wheel speed deviation represented by the front and rear wheel difference of the left and right wheel speed ratios, a function depending on the deviation of the rotational states of the left and right wheels such as the front to rear wheel ratio of the left to right wheel speed ratios where changes of the deviation of the rotational states of the left and right wheels in making a turn are canceled by each other may be used.

(Fourth Embodiment)

Before explaining the fourth embodiment in detail, an explanation will be given of knowledge provided by the inventors prior to the invention thereof. The inventors found the following knowledge as a result of intensively repeating experimental research on wheel speeds and tire air pressures of a four wheel drive or rear wheel drive vehicle when running the vehicle.

The wheel speed deviation D that is the rotational state value is calculated according to Equation (10) from the detected wheel speeds of four wheels and a front to rear wheel speed ratio β that is a slip state value is calculated by Equation (11). In these equations, $V_{FR}$ is the right front wheel speed, $V_{FL}$ is the left front wheel speed, $V_{RR}$ is the right rear wheel speed and $V_{RL}$ is the left rear wheel speed. The wheel speed deviation D is a variable given as a difference between the front and rear wheels with respect to the wheel speed ratios of the left to right wheels where the value does not depend on the turning operation of the vehicle at all, and when the air pressure of either tire in the four wheels is lowered by puncture or the like, the value is increased or reduced. The front to rear wheel speed ratio β represents a degree of slip state caused in the drive wheels by the operation of the drive force transmitted to the drive wheels and is indicative of the characteristic that the smaller the front to rear wheel speed ratio β, the more the drive wheels are slipped in the case of the rear wheel drive.

$$D = \frac{V_{FR}}{V_{FL}} - \frac{V_{RR}}{V_{RL}} \quad (10)$$

$$\beta = \frac{V_{FR} + V_{FL}}{V_{RR} + V_{RL}} \quad (11)$$

Figure 16:
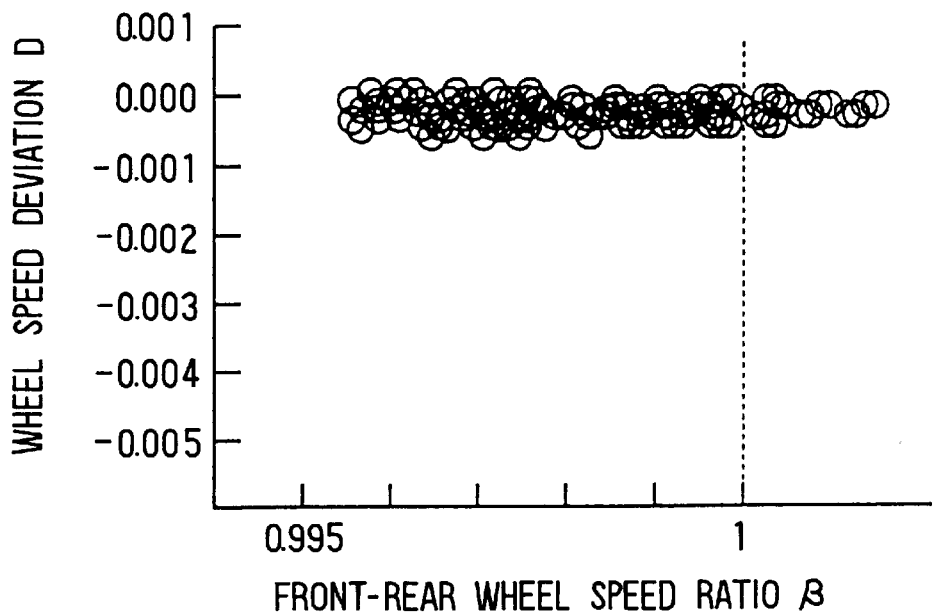
FIGS. 16–18 are graphs for explaining knowledge of the inventors constituting the basis of the present invention.
Figure 17:
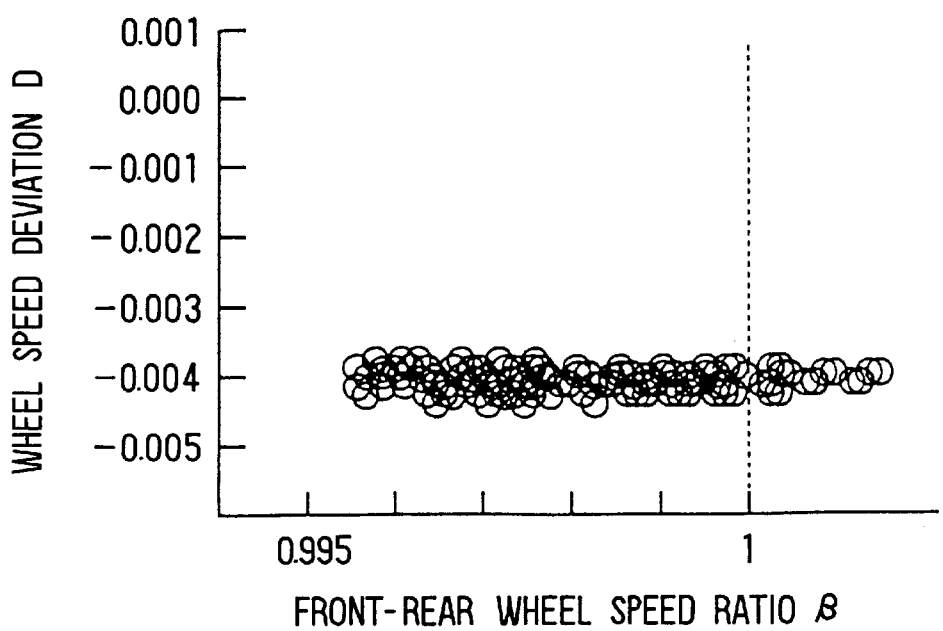
Figure 18:
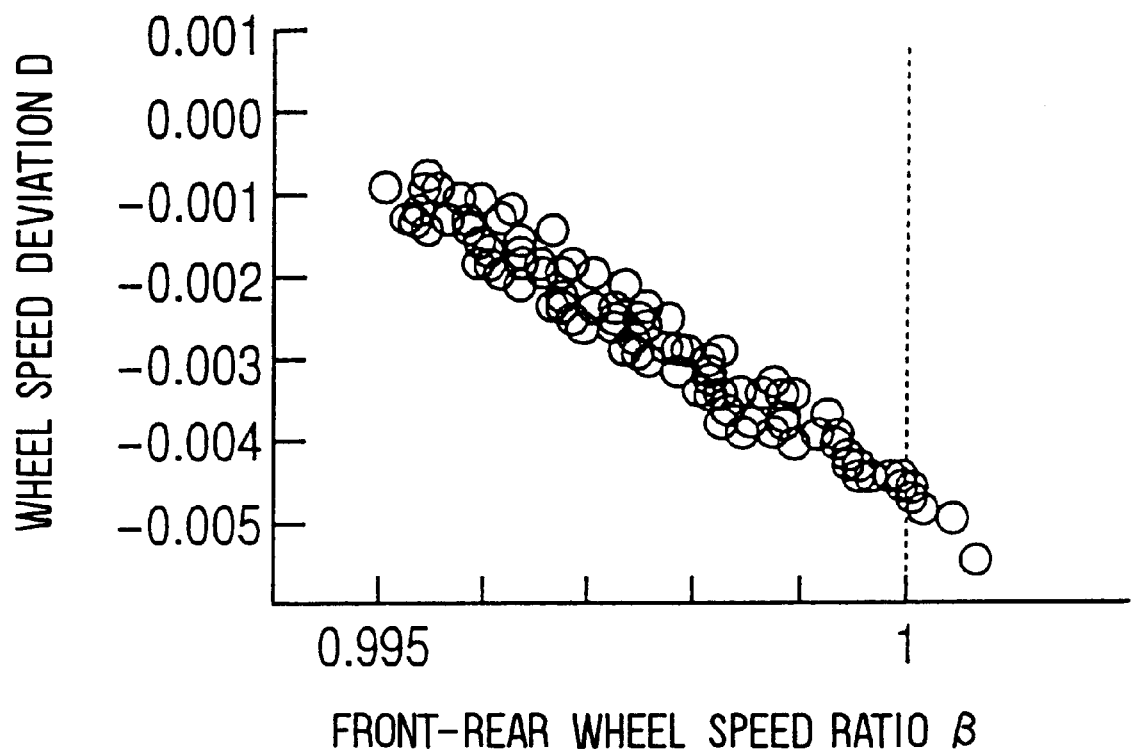

FIGS. 16–18 show the relationship between the wheel speed deviation D and the front to rear wheel speed ratio β. FIG. 18 shows a case where the four wheels is under a prescribed pressure. FIG. 17 shows a case where the left front wheel (driven wheel) is under a prescribed pressure—100 kPa and FIG. 18 shows a case where the right rear wheel (drive wheel) disposed at a diagonal position of the left front wheel is under a prescribed pressure—100 kPa. When the front to rear wheel speed ratio β is 1, that is, the vehicle is not slipping, the wheel speed deviation D stays the same irrespective of whether the wheel having lowered tire pressure is a driven wheel (FIG. 16) or a drive wheel (FIG. 17). However, when the front to rear wheel speed ratio β becomes smaller, in the case where the wheel having lowered tire air pressure is a drive wheel, the wheel speed deviation D approaches that in the case of a prescribed pressure (FIG. 18). When the wheel having lowered tire air pressure is a driven wheel, no dependency with respect to the front to rear wheel speed ratio β is observed.

It is recognized that the following phenomenon occurs. Generally, when tire air pressure of one wheel is lowered, the rotational radius of the wheel is reduced and the wheel speed becomes faster than the wheel speed of other wheels. However, when the wheel having lowered tire air pressure is one of the drive wheels, although the rotational radius of the wheel is reduced, the ground area is increased and accordingly, a large force for restraining slip is caused compared with that of the other one of the drive wheels having no lowered tire air pressure. Accordingly, when the drive force is operated, it is easier for a tire having no lowered tire air pressure to slip than a tire having lowered tire air pressure where the rotational radius of the wheel is reduced. Accordingly, in the case of the drive wheel, even if tire air pressure of one of the wheels is lowered, the difference between the left and right wheel speeds become smaller in accordance with the drive force.

As a result, the wheel speed deviation D approaches a value where all four wheels are under a prescribed tire air pressure (FIG. 18) in accordance with the front to rear wheel speed ratio β in the case where the tire air pressure of one of the drive wheels is lowered.

Meanwhile, when the wheel having lowered tire air pressure is a driven wheel, the drive force is not operated and accordingly, the wheel speed deviation D stays constant even if the front to rear speed ratio β is changed.

Further, since such a phenomenon is caused, the wheel speed deviation D does not stay constant depending on the slip state of the drive wheels and the detection certainty of tire air pressure is recognized to lower.

The present invention has been carried out based on such knowledge.

Figure 19:
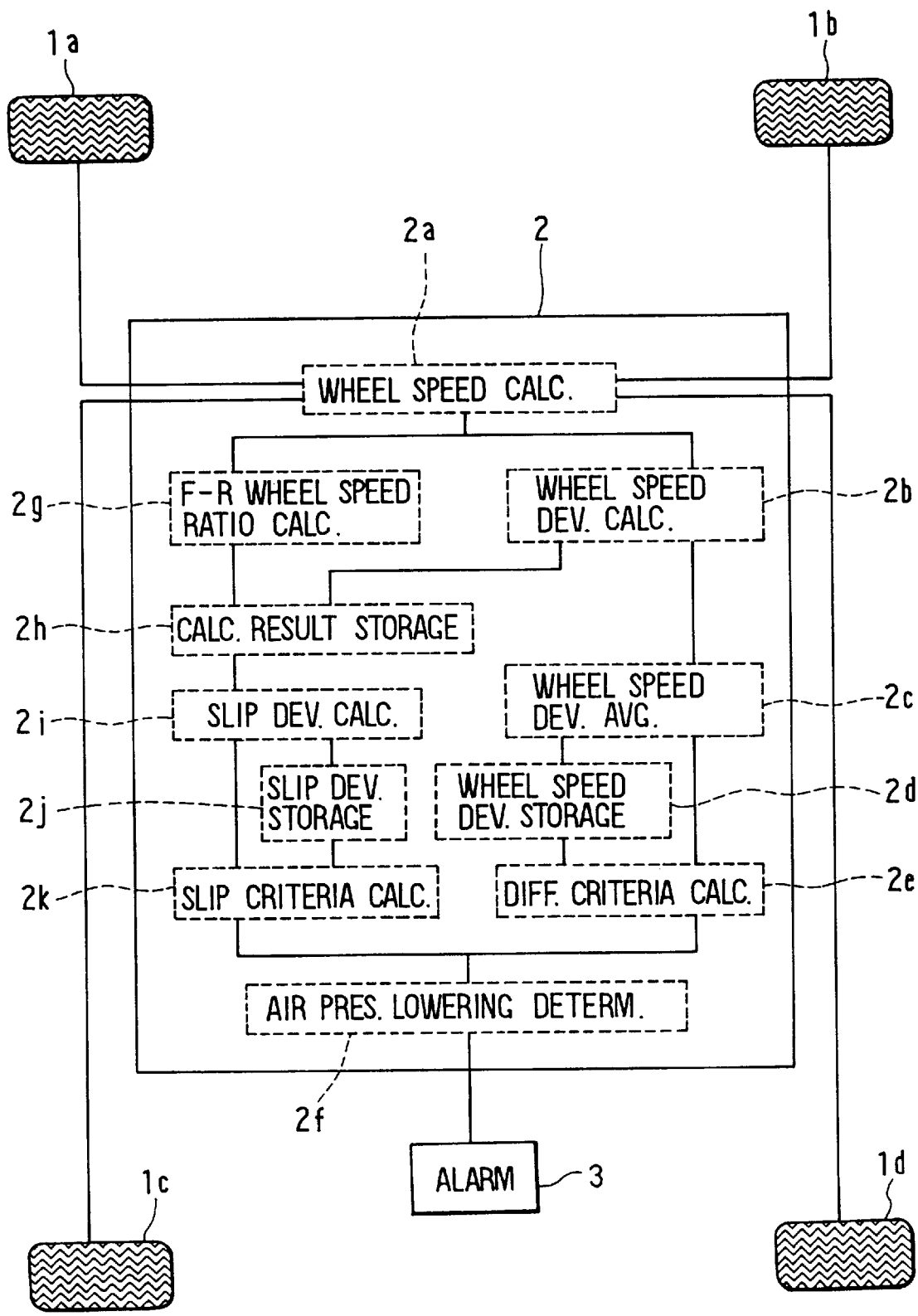
FIG. 19 is a block diagram of a tire air pressure detecting device according to a fourth preferred embodiment of the present invention.

FIG. 19 shows a tire air pressure detecting device according to a fourth preferred embodiment of the present invention. The tire air pressure detecting device is mounted on a vehicle of a front wheel drive or a rear wheel drive and is implemented by wheel speed sensors 1a, 1b, 1c and 1d which are wheel speed detecting means provided in correspondence with the respective tires of the vehicle, a calculation processing unit 2 for inputting signals from the wheel speed sensors 1a–1d and an alarm device 3 for alarming to notify a driver of lowering of air pressure by an alarm signal from the calculation processing unit 2. Two of the wheel speed sensors 1a–1d (for example, 1a, 1b) correspond to driven wheels and remaining two (for example, 1c, 1d) correspond to drive wheels.

An explanation will be given of the functional constitution of the calculation processing unit 2 as follows. Pulse signals inputted from the wheel speed sensors 1a–1d are formed into numerical data of the wheel speeds by a wheel speed calculating unit 2a. The numerical data of the wheel speeds are formed into a wheel speed deviation by a wheel speed deviation calculating unit 2b and formed into a front to rear wheel speed ratio by a front to rear wheel speed ratio calculating unit 2g.

The wheel speed deviation is inputted to a pressure difference criteria calculating unit 2e via a wheel speed deviation averaging unit 2c. A wheel speed deviation storing unit 2d stores the calculation result from the wheel speed deviation averaging unit 2c and outputs it to the pressure difference criteria calculating unit 2e. The pressure difference criteria calculating unit 2e forms the inputted data into pressure difference criteria.

Meanwhile, the front to rear wheel speed ratio is inputted to a slip criteria calculating unit 2k via a calculation result storing unit 2h and a slip deviation calculating unit 2i. A slip deviation storing unit 2j stores the calculation result from the slip deviation calculating unit 2i and outputs it to the slip criteria calculating unit 2k. The slip criteria calculating unit 2k forms the inputted data into a slip criteria. Data outputted from the pressure difference criteria calculating unit 2e and the slip criteria calculating unit 2k are formed into criteria data of tire air pressure state by an air pressure lowering determining unit 2f and outputted to an alarm device 3.

Figure 20:
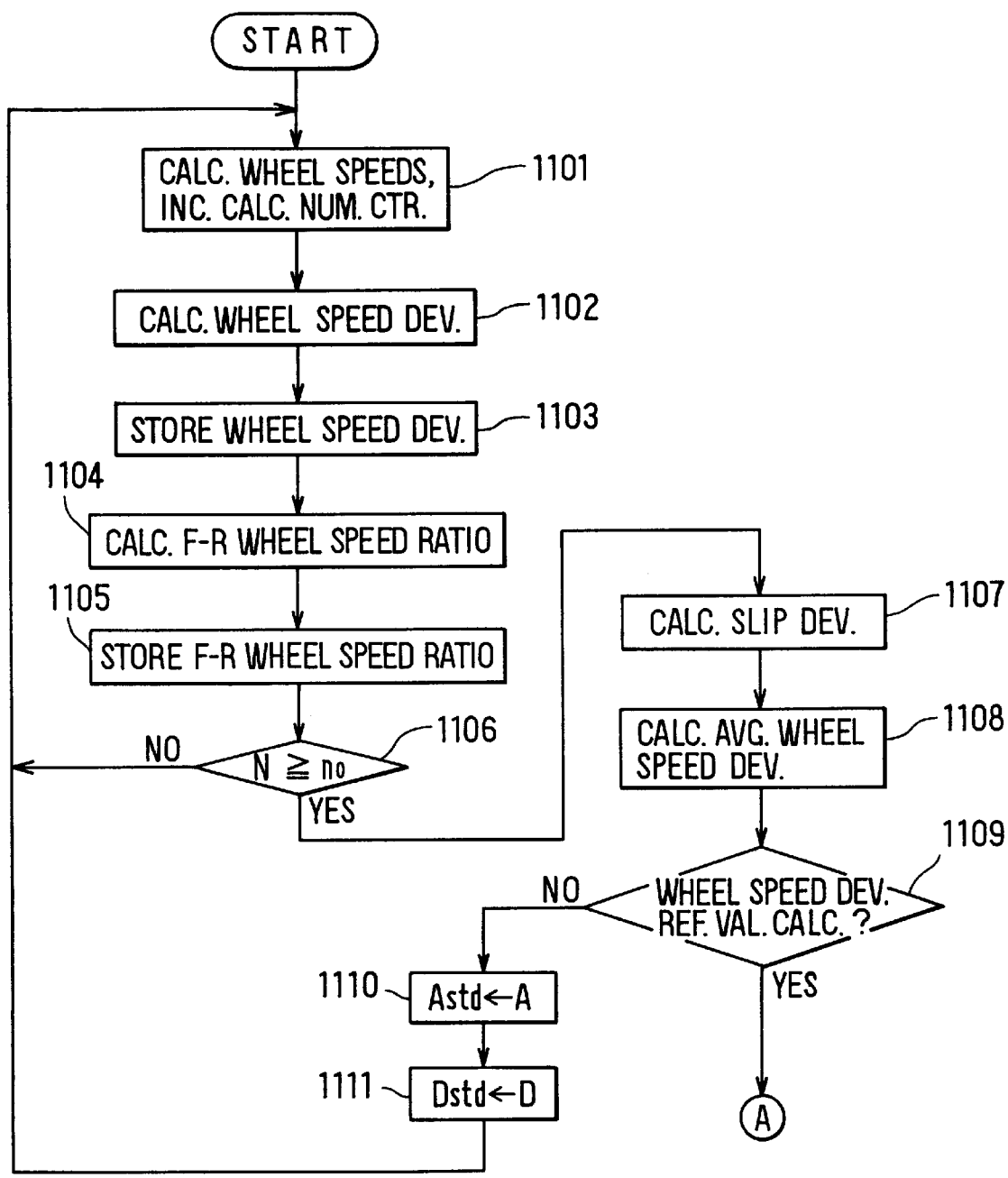
FIGS. 20 and 21 are flowcharts of the operation of the fourth embodiment.

The calculation processing unit 2 is constituted by a microprocessor or the like and the above-described respective functions are executed in software. FIG. 20 shows a flow of processing from wheel speed calculation to alarming of air pressure lowering executed by the calculation processing unit 2. At Step 101, by operating the wheel speed calculating unit 2a implementing wheel speed detecting means along with the wheel speed sensors 1a–1d, the wheel speeds of the respective wheels are calculated from numbers of pulse signals from the respective wheel speed sensors 1a–1d inputted in a predetermined time period, for example, 5 ms. The calculation of the wheel speeds is performed at a period of, for example, 0.5 sec. Next, a number of times of calculation N is incremented by 1.

At Step 102, by operating the wheel speed deviation calculating unit 2b that is rotational state value calculating means, the wheel speed deviation D is calculated by Equation (10).

At Step 103, by operating the slip deviation calculating unit 2i that is front to rear wheel speed deviation calculating means, the front to rear wheel speed ratio β is calculated by Equation (11) based on the wheel speeds $V_{FR}$, $V_{FL}$, $V_{RR}$ and $V_{RL}$ used in Step 102.

At Steps 103 and 105, by operating the calculation result storing unit 2h, calculation results of Steps 102 and 104 are temporarily stored in a memory. Parameters D(N) and β(N) are parameters having a magnitude of $n_0$ and the calculated wheel speed deviation D and front to rear speed ratio β are stored to corresponding D(N) and β(N) (Steps 103, 105).

At Step 106, the number of times of calculation N is compared with the predetermined value $n_0$. If N<$n_0$, the operation returns to step 101. If N≧$n_0$, that is, when $n_0$ times of calculation and hold (Steps 102–S105) of the wheel speed deviation D and the front to rear wheel speed ratio β have been carried out, the operation proceeds to Step 107.

Step 107 is performed by regression calculating means and data of $n_0$ sets of the wheel speed deviation D and the front to rear wheel speed ratio β are read from the memory and are regressed into a first order function by a least squares method. That is, the slope A of the regression straight line is given by a function F(D,β,$n_0$) of {D(N)}, {β(N)} and $n_0$ and therefore, the slope is calculated and is determined to be the slip deviation A that is a slip state value. The slip deviation A shows dependency of the wheel speed deviation D with respect to the front to rear wheel speed ratio β.

At Step 108, by operating the wheel speed deviation averaging unit 2c, $n_0$ of the wheel speed deviations D(N) (N=1 through $n_0$) are averaged by Equation (12) (averaged wheel speed deviation is also designated by D):

$$D = \frac{1}{n_0} \sum D(N) \qquad (12)$$

Next, whether the reference value $D_{std}$ of the wheel speed deviation D has been detected is determined (Step 109), and if it has not been detected, the slip deviation A and the wheel speed deviation D calculated in Steps 107 and 108 are determined to be respectively the reference value $A_{std}$ of the slip deviation and the reference value $D_{std}$ of the wheel speed deviation (Steps 110, 111) and the operation returns to Step 101. That is, the reference value $A_{std}$ of the slip deviation and the reference value $D_{std}$ of the wheel speed deviation are the slip deviation A and the wheel speed deviation D which have been calculated first after starting the device and substantially are the slip deviation value A and the wheel speed deviation D in starting the device that is the reference time point.

Figure 21:
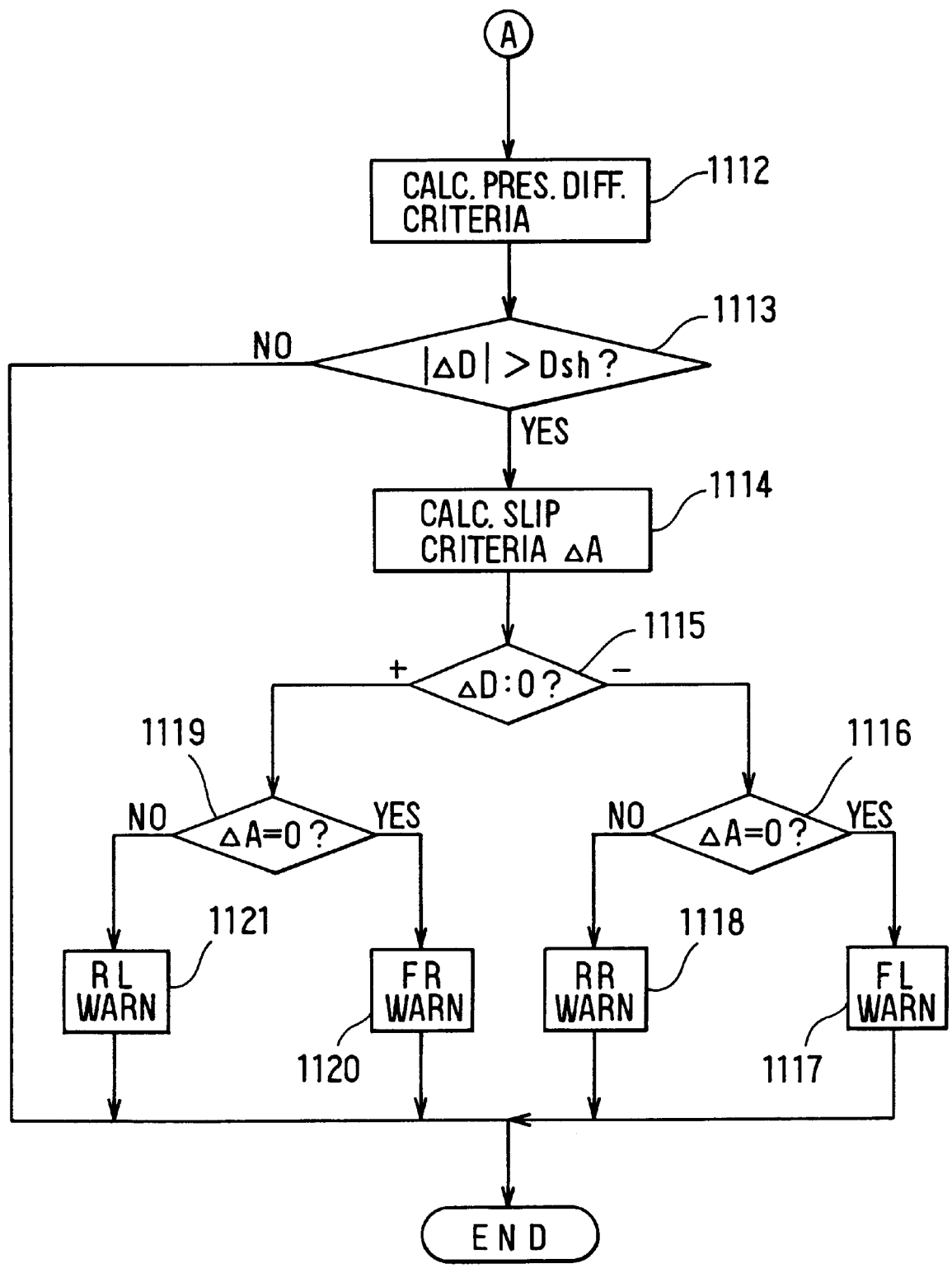

Once the reference values $A_{std}$ and $D_{std}$ are set, the operation proceeds from Steps 109–112 thereafter (FIG. 21). At Step 112, by operating the pressure difference criteria calculating unit 2e, the pressure difference criteria ΔD is calculated by Equation (13). According to the pressure difference criteria ΔD, the current wheel speed deviation D is corrected with the reference value $D_{std}$ as an offset amount and due to the correction, the influence of tire wear states of the respective wheels in starting the device that is included in the wheel speed deviation D is removed. Change of tire air pressure state from starting the device is reflected on the pressure difference criteria ΔD.

$$\Delta D = D_{std} - D \qquad (13)$$

Steps 113–121 are operated by abnormality determining means. At Step 113, the magnitude |ΔD| of the pressure difference criteria ΔD is compared with the threshold value $D_{sh}$ that is an upper limit value. The threshold value $D_{sh}$ is a value which can be determined as air pressure lowering and which is previously set by experiments or the like and stored in the memory of the calculation processing unit 2.

When |ΔD| is smaller than $D_{sh}$, tire air pressure is determined to be normal. On the other hand, if |ΔD| is larger than $D_{sh}$, the tire air pressure is determined to be lowered and the operation proceeds to Step 114.

At Step 114, by operating the slip criteria calculating unit 2k, the slip criteria ΔA is calculated by Equation (14). The slip criteria ΔA is determined to be a difference between the slip deviation A and the reference value $A_{st}$ to remove influence of tire wear states of the respective wheels in starting the device as in the case of the pressure difference criteria ΔD.

$$\Delta A = A_{std} - A \qquad (14)$$

At Step 115, the degree of positiveness or negativeness of the pressure difference criteria ΔD is determined. If the pressure difference criteria ΔD is negative, the wheel speed $V_{FL}$ of the left front wheel (FL) or the wheel speed $V_{RR}$ of the right rear wheel (RR) is increased and accordingly, the tire air pressure of the left front wheel (FL) or the right rear wheel (RR) is determined to be lowered and the operation proceeds to Step 116. At Step 116, whether the slip criteria ΔA is recognized as 0 is determined. If the slip criteria ΔA is recognized as 0, a driven wheel is provided with a lowered tire air pressure and an alarm signal alarming lowering of tire air pressure of the left front wheel (FL) is outputted to the alarm device 3 (Step 117). If the slip criteria ΔA is not recognized as 0, a drive wheel is provided with the lowered tire air pressure and an alarm signal alarming lowering of tire air pressure of the right rear wheel (RR) is outputted to the alarm device 3 (Step 118).

When the pressure criteria ΔD is positive at Step 115, the wheel speed $V_{FR}$ of the right front wheel (FR) or the wheel speed $V_{RL}$ of the left rear wheel (RL) is increased and accordingly, the air pressure of the right front wheel (FR) or the left rear wheel (RL) is determined to be lowered and the operation proceeds to Step 119. When the slip criteria ΔA is recognized as 0, a driven wheel is provided with the lowered tire air pressure and an alarm signal alarming lowering of air pressure of the right front wheel (FR) is outputted to the alarm device 3 (Step 120). When the slip criteria ΔA is not recognized as 0, a drive wheel is provided with the lowered tire air pressure and an alarm alarming lowering of the air pressure of the left rear wheel (RL) is outputted to the alarm device 3 (Step 121).

As described above, according to the embodiment, the wheel having lowered tire air pressure can be specified from the respective wheel speeds of four wheels.

(Fifth Embodiment)

Figure 22:
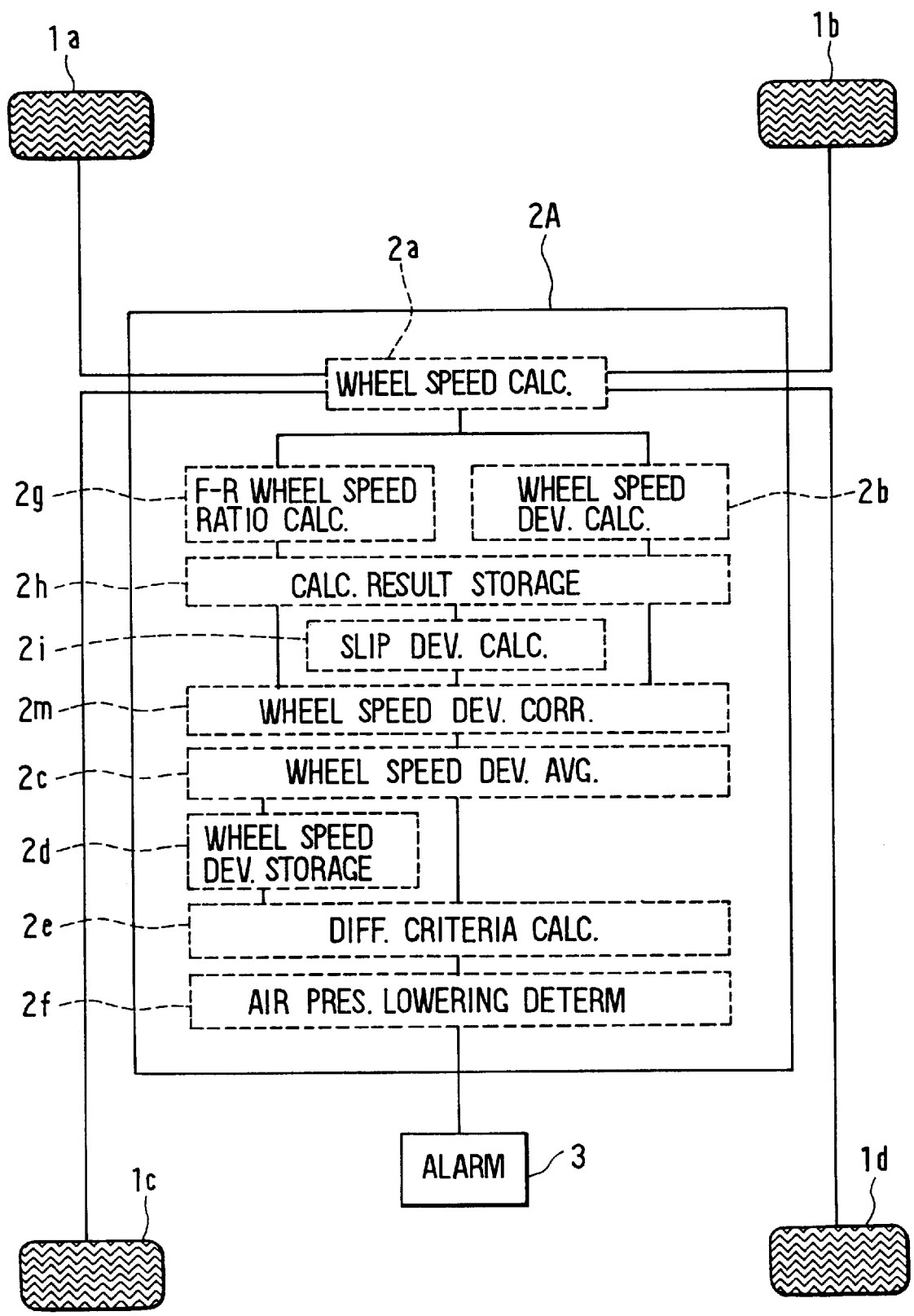
FIG. 22 is a block diagram of a tire air pressure detecting device according to a fifth preferred embodiment of the present invention.
Figure 23:
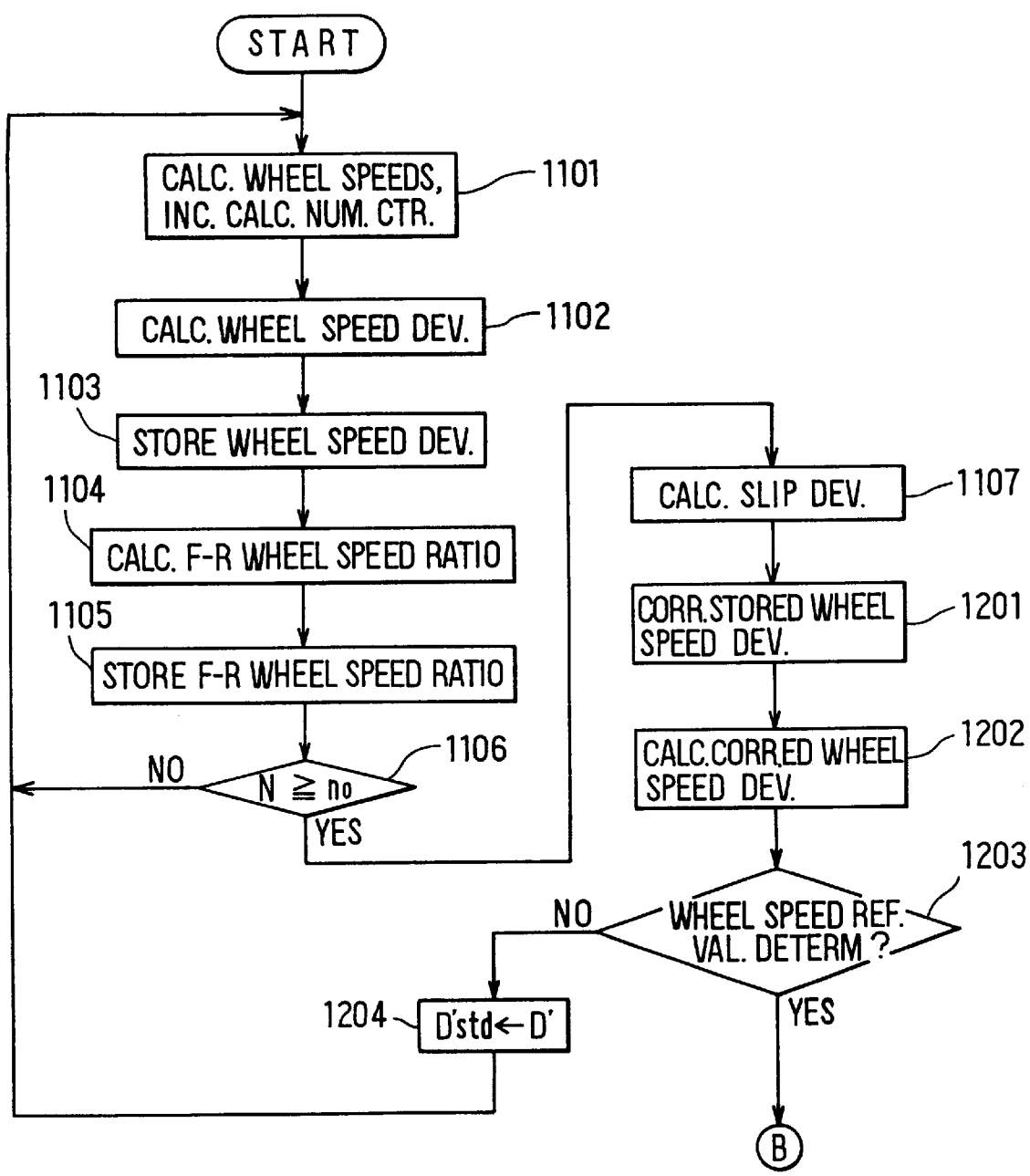
FIG. 23 is a flowchart of the operation of the fifth embodiment.
Figure 24:
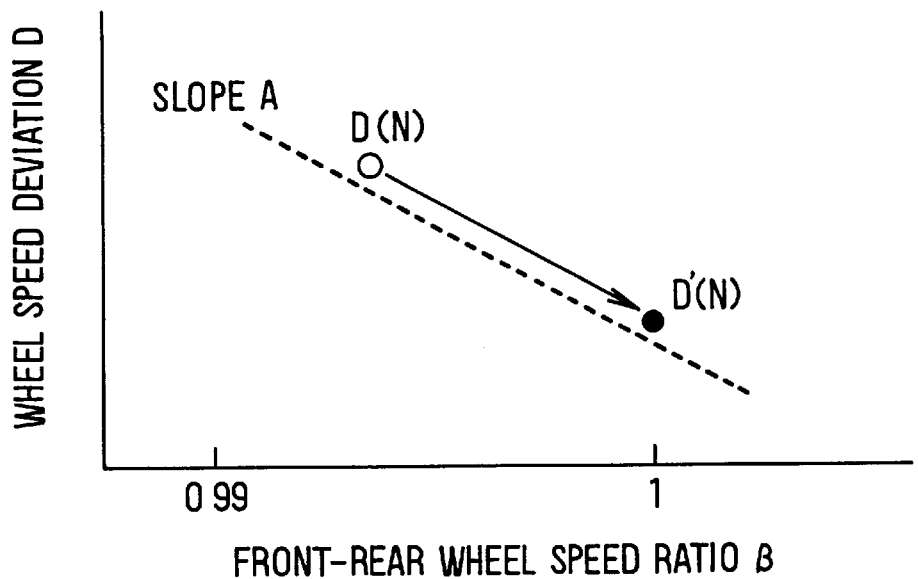
FIG. 24 is a graph for explaining the operation of the fifth tire air pressure detecting device according to the present invention.

FIG. 22 shows a tire air pressure detecting device according to a fifth preferred embodiment of the present invention. The calculation processing unit 2 of the fourth embodiment is replaced by another calculation processing unit 2A. A flow of processing from wheel speed calculation to alarming of air pressure lowering executed in the calculation processing unit 2A is shown in FIGS. 23 and 24. In these drawings, portions having the same numbers as in FIGS. 19–21 are similar and therefore, an explanation will be given centering on differences thereof from the fourth embodiment. According to the calculation processing unit 2A of FIG. 22, the slip criteria calculating unit 2k of FIG. 19 is omitted and a wheel speed deviation correcting unit 2m for inputting respective outputs from the wheel speed deviation calculating unit 2b, the front to rear wheel speed ratio calculating unit 2g and the calculation result storing unit 2h is provided at the fore stage of the wheel speed deviation averaging unit 2c.

In FIG. 23, Steps 201 and 202 successive to Step 107 where the slip deviation A is calculated are performed by the rotational state correcting means. At Step 201, by operating the wheel speed deviation 2m, D(N) is corrected by Equation (15). In Equation (15), D'(N) designates the wheel speed deviation after correction and is an arrangement having the magnitude of $n_0$.

$$D'(N)=D(N)+A(1-\beta) \tag{15}$$

FIG. 24 is a graph explaining correction of the wheel speed deviation D by Equation (14). The broken line is a regression straight line based on $n_0$ sets of the wheel speed deviations D and the front to rear wheel speed ratios β. A(1-β) in Equation (15) designates an amount of the wheel speed deviation D on the regression straight line when the front to rear wheel speed ratio β is changed from β to 1 that is the reference value. That is, according to Equation (14) the respective wheel speed deviations D(N) are moved in parallel along the regression straight line by which the value is corrected to the value of the front to rear wheel ratio β=1. Here, 1 designates the front to rear wheel speed ratio β when the drive wheels are not slipped and although the ratio is preferable as the reference value, the present invention is not necessarily limited thereto and may be modified as long as it is not contrary to the gist of the present invention.

At Step 202, by operating the wheel speed deviation averaging unit 2c, data of the wheel speed deviations D'(N) are averaged by Equation (16):

$$D' = \frac{1}{n_0}D'(N) \tag{16}$$

Next, whether the reference value $D'_{std}$ of the wheel speed deviation D' has been detected is determined (Step 203) and if it has not been determined, the wheel speed deviation D' calculated at Step 202 is determined to be the reference value $D'_{std}$ of the wheel speed deviation (Step 204) and the operation returns to Step 101.

Figure 25:
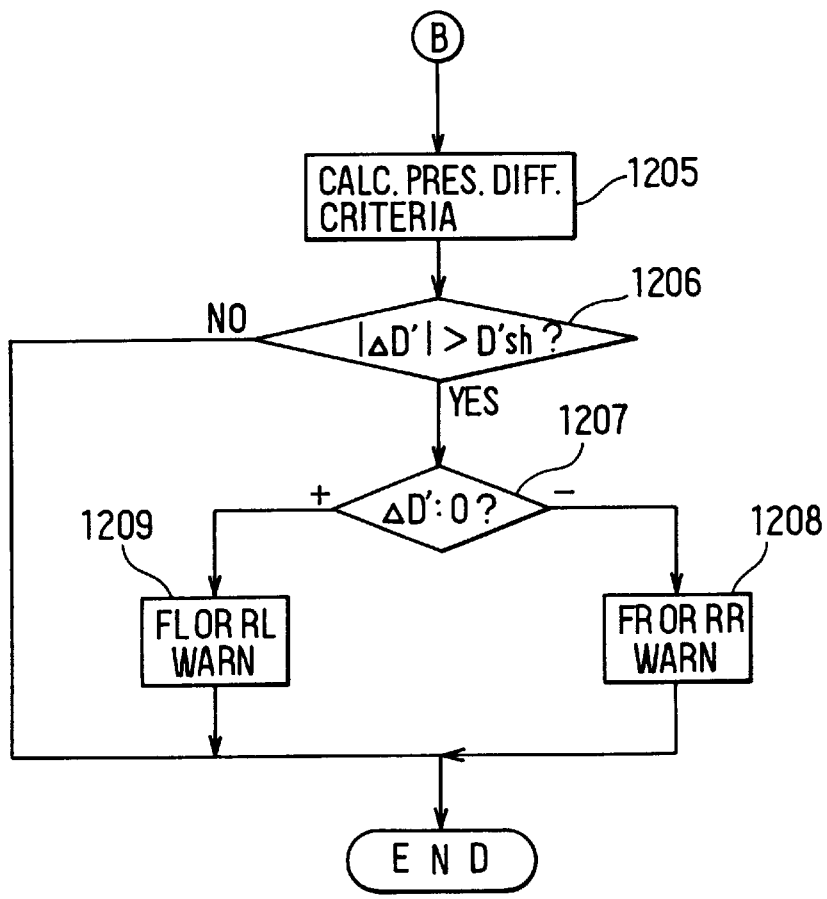
FIG. 25 is a flowchart of the operation of the fifth embodiment.

When $D_{std}$ is once set, the operation proceeds from Steps 203 to 205 thereafter (FIG. 25). At Step 205, by operating the pressure difference criteria calculating unit 2e, the pressure difference criteria ΔD' is calculated by Equation (17):

$$\Delta D'=D'_{std}-D \tag{17}$$

Steps 206–209 are performed by the air pressure lowering determining unit 2f that is the abnormality determining means. At Step 206, the magnitude |ΔD'| of the pressure difference criteria ΔD' is compared with the threshold value $D'_{sh}$ that is an upper limit value. The threshold value $D'_{sh}$ is a value which can determine lowering of air pressure and is stored in the memory of the calculation processing unit 2A by previously setting by experiments or the like.

When |ΔD'| is smaller than $D'_{sh}$, tire air pressure is determined to be normal.

When |ΔD'| is larger than $D'_{sh}$, the tire air pressure is determined to be lowered and the operation proceeds to Step 207 and the degree of positiveness or negativeness of ΔD' is determined. When ΔD' is negative, the wheel speed $V_{FL}$ of the left front wheel (FL) or the wheel speed $V_{RR}$ of the right rear wheel (RR) is increased and accordingly, the tire air pressure of the left front wheel (FL) or the right rear wheel (RR) is determined to be lowered and an alarm signal alarming that is outputted to the alarm device 3 (Step 208).

When the pressure difference criteria ΔD' is positive at Step 207, the wheel speed $V_{FR}$ of the right front wheel (FR) or the wheel speed $V_{RL}$ of the left rear wheel (RL) is increased and accordingly, the air pressure of the right front wheel (FR) or the left rear wheel (RL) is determined to be lowered and an alarm signal to that effect is outputted to the alarm device 3 (Step 209).

Figure 26A:
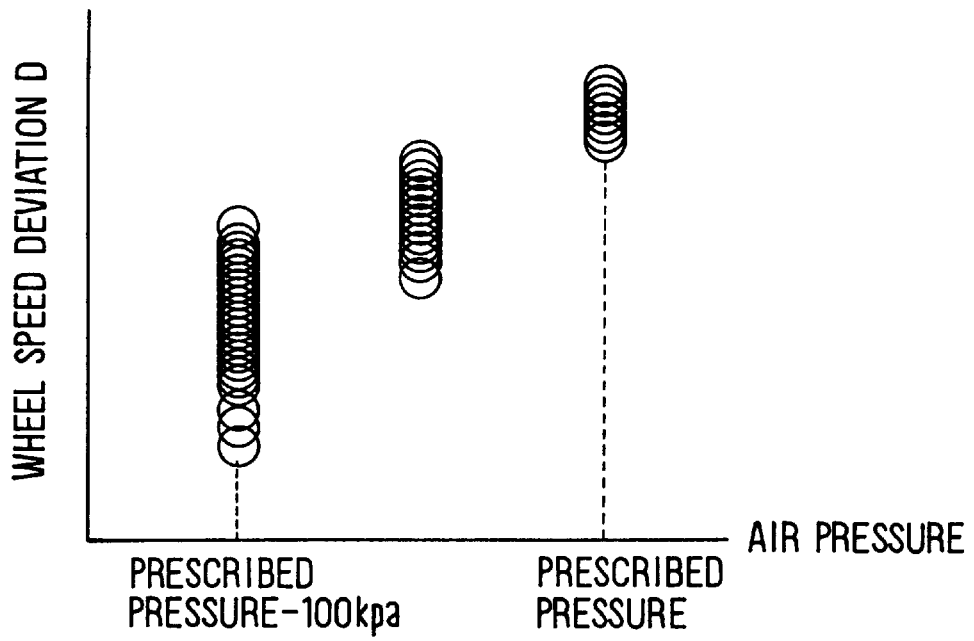
FIG. 26A is a graph showing the characteristic of one conventional tire air pressure detecting device and FIG. 26B is a graph showing the characteristic of the fifth tire air pressure detecting device according to the present invention.
Figure 26B:
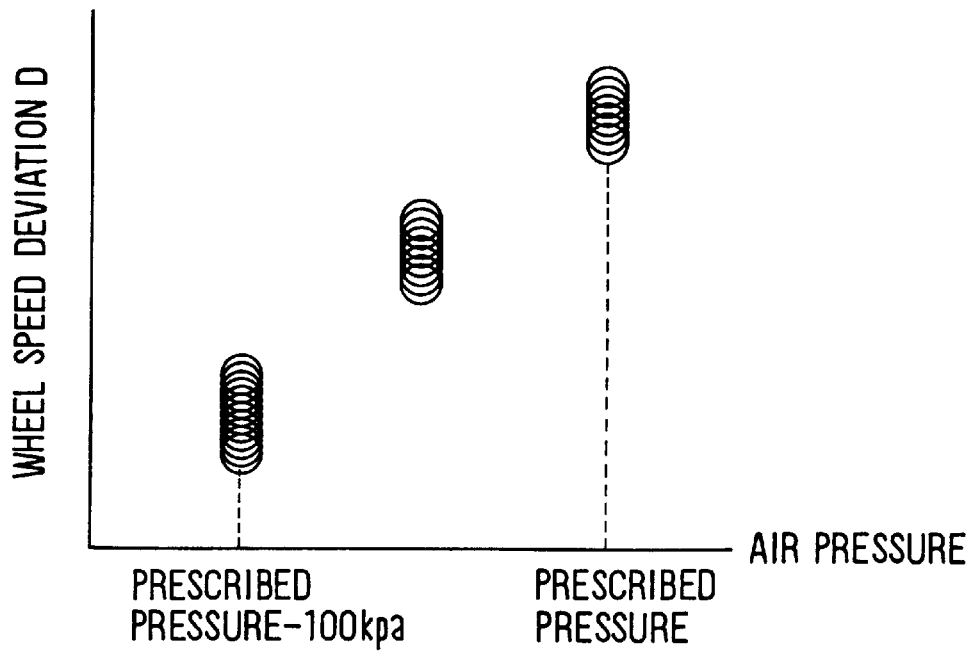

FIGS. 26A and 26B are drawings for comparing the present invention with the conventional technology having no correction by Equation (15) and show a relationship between the wheel speed deviation D and the tire air pressure. According to the conventional technology (FIG. 26A), the lower the tire air pressure, the larger the deviation of the wheel speed deviation D. In contrast, according to the present invention (FIG. 26B), the wheel speed deviation D is corrected to a value when the front to rear wheel speed ratio is 1, that is, when the drive wheels do not slip, and even if the slip state is dispersed by a variation in the drive force transmitted to the drive wheels, the influence is removed and accordingly, the dispersion of the wheel speed deviation D stays small even if the tire air pressure is lowered. Therefore, according to the tire air pressure detecting device of this embodiment, the detecting certainty of lowering of the tire air pressure is high.

(Sixth Embodiment)

Figure 28:
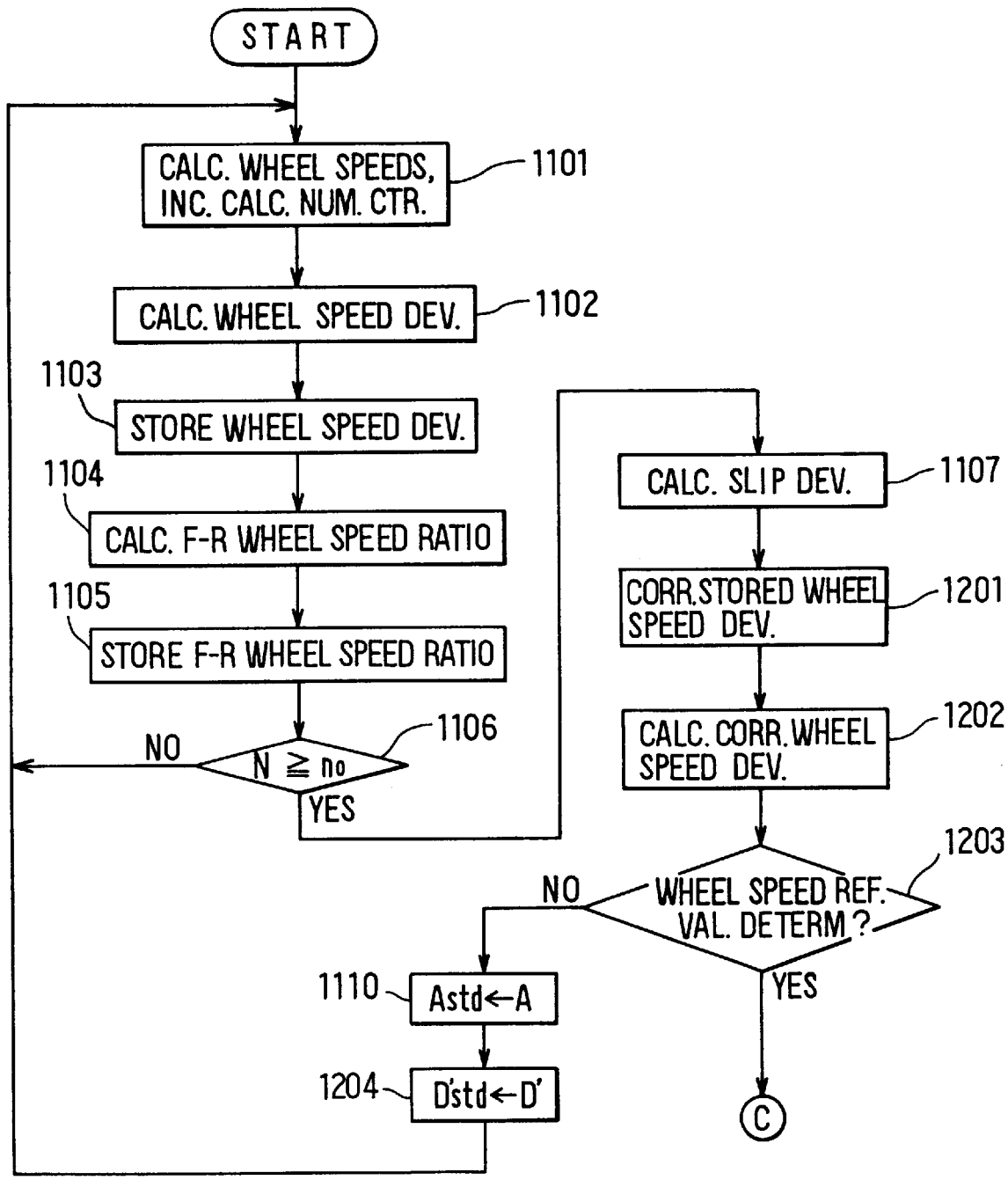
FIGS. 28 and 29 are flowcharts of the operation of the sixth embodiment.
Figure 29:
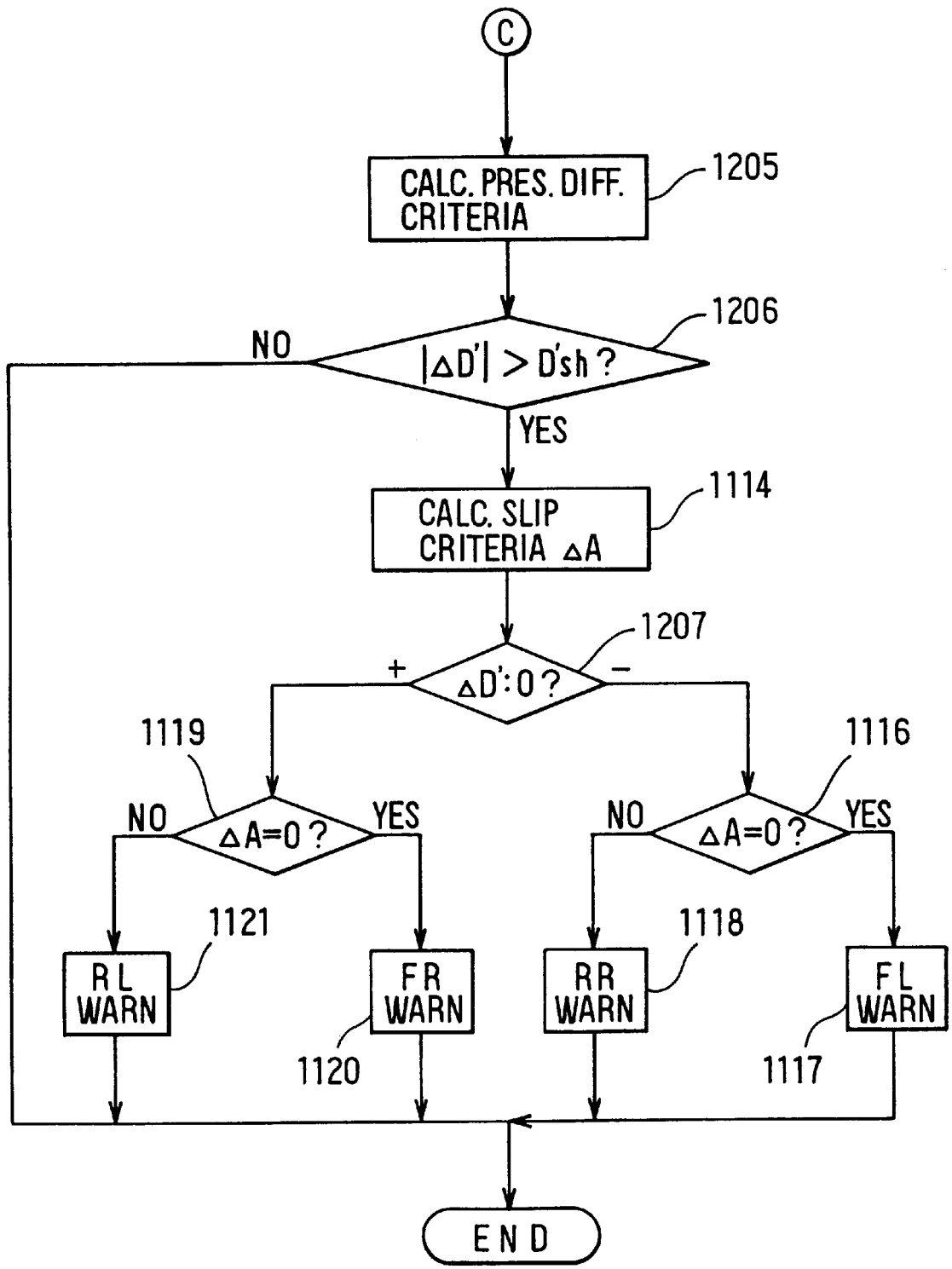

FIG. 27 shows a tire air pressure detecting device according to a sixth preferred embodiment of the present invention. The calculation processing unit 2 in the fourth embodiment is replaced by another calculation processing unit 2B. The functional constitution of the calculation processing unit 2B is similar to that of the fifth embodiment. A flow of processing from wheel speed calculation to alarming of air pressure lowering executed in the calculation processing unit 2B is shown in FIGS. 28 and 29. In these Figures, portions having the same numbers as in FIGS. 19–21 and FIGS. 22–24 are similar and accordingly, an explanation will be given centering on differences thereof from the fourth and fifth embodiments. In FIG. 27, data outputted from the wheel speed deviation calculating unit 2b is inputted to the calculation result storing unit 2h and to the wheel speed deviation averaging unit 2c via the wheel speed deviation correcting unit 2m. Data from the slip deviation calculating unit 2i is inputted to the wheel speed deviation correcting unit 2m.

At Step 203 of FIG. 28, when the reference value $D'_{std}$ of the wheel speed deviation D' has not been detected, the slip deviation value A and the wheel speed deviation D' calculated in Steps 107 and 202 are respectively determined to be the reference value $A_{std}$ of the slip deviation value and the reference value $D'_{std}$ of the wheel speed deviation (Steps 110, 204) and the operation returns to Step 101.

When the reference value $A_{std}$ of the slip deviation value and the reference value $D'_{std}$ of the wheel speed deviation have once been set, the operation proceeds from Step 203 to Step 205 (FIG. 29) and the pressure difference criteria ΔD' is calculated.

The procedure at Step 206 and thereafter is performed by the air pressure lowering determining unit 2f that is the abnormality determining means. When |ΔD'| is larger than $D'_{sh}$, the tire air pressure state is determined to be abnormal and the operation proceeds to Step 114. The procedure at Step 114 and thereafter is substantially the same as the procedure at Step 114 and thereafter in FIG. 21 and at Step 207 in place of Step 115 of FIG. 18, the degree of positiveness or negativeness of the pressure difference criteria ΔD' is determined.

According to the embodiment, not only the effects of the fourth and fifth embodiments are provided, but an excellent effect is also provided where the calculation load is not excessively large since the functions of essential portions of the fourth and fifth embodiments are combined.

Although the present invention has been fully described in connection with the preferred embodiments thereof with reference to the accompanying drawings, it is to be noted that various changes and modifications will become apparent to those skilled in the art.

For example, the present invention is also applicable also to a device where the air pressure state of a tire is determined by another rotational state value different from that of Equation (10).

Although tire air pressure state is determined by the pressure difference criteria or the slip criteria (Steps 112, 115 or the like), it may be determined by the wheel speed deviation and the slip deviation value. In this case, the tire air pressure state in the initial state is known.

Although the air pressure state of tire is determined by detection by the pressure difference determination in the region where the vehicle speed V exceeds the limit speed $V_{sh}$, the air pressure state of the tire may be determined in the region described in the section preceding the description of the fourth embodiment above.

Such changes and modifications are to be understood as being included within the scope of the present invention as defined by the appended claims.

What is claimed is:

1. A tire air pressure detecting device comprising:
    wheel speed detecting means for successively detecting wheel speeds of respective wheels in a running vehicle;
    resonance frequency sampling means for sampling resonance frequencies of tires attached to the respective wheels from the respective wheel speeds detected by the wheel speed detecting means;
    determining means for determining air pressure states of the tires based on the resonance frequencies;
        wherein the determining means includes
            rotational state value calculating means for calculating a rotational state value depending on a difference between a deviation in rotational states of left and right wheels in driven wheels and a deviation in rotational states of left and right wheels in drive wheels,
            storing means for storing a previously-determined relationship between the resonance frequency and the rotational state value when air pressure of the tire changes,
            rotational state value change amount calculating means for calculating a timewise change amount of the rotational state value,
            resonance frequency change amount calculating means for calculating a timewise change amount of the resonance frequency of the driven wheel,
            correcting means for converting, based on the relationship stored in the storing means, the timewise change amount of the resonance frequency of the driven wheel into the timewise change amount of the rotational state value and correcting the timewise change amount of the rotational state value by the converted timewise change amount, and
            drive wheel resonance frequency estimating means for converting the timewise change amount of the rotational state which has been corrected by the correcting means into the timewise change amount of the resonance frequency of the drive wheel based on the relationship stored in the storing means when the vehicle speed is equal to or higher than a previously set upper limit value, and estimating the resonance frequency of the drive wheel from the resonance frequency of the drive wheel before the vehicle speed exceeds the upper limit value and the timewise change amount;
        the determining means is for determining the air pressure state of the tire of the drive wheel based on the resonance frequency estimated by the drive wheel resonance frequency estimating means when the vehicle speed is equal to or higher than the upper limit value.

2. The tire air pressure detecting device according to claim 1, wherein the deviation is a wheel speed ratio.

3. The tire air pressure detecting device according to claim 2, wherein the determining means is for determining the air pressure state of the tire of the drive wheel based on the timewise change amount of the rotational state value which has been corrected by the correcting means when the resonance frequency of the drive wheel before the vehicle speed exceeds the upper limit value cannot be sampled.

4. The tire air pressure detecting device according to claim 3, wherein the determining means is for determining the tire air pressure state of the drive wheel based on the rotational state value calculated by the rotational state value calculating means when the timewise change amount of the rotational state value cannot be calculated.

5. The tire air pressure detecting device according to claim 2, wherein the determining means is for determining the tire air pressure state of the drive wheel based on the rotational state value calculated by the rotational state value calculating means when the timewise change amount of the rotational state value cannot be calculated.

6. The tire air pressure detecting device according to claim 1, wherein the deviation is a wheel acceleration ratio.

7. The tire air pressure detecting device according to claim 6, wherein the determining means is for determining the air pressure state of the tire of the drive wheel based on the timewise change amount of the rotational state value which has been corrected by the correcting means when the resonance frequency of the drive wheel before the vehicle speed exceeds the upper limit value cannot be sampled.

8. The tire air pressure detecting device according to claim 7, wherein the determining means is for determining the tire air pressure state of the drive wheel based on the rotational state value calculated by the rotational state value calculating means when the timewise change amount of the rotational state value cannot be calculated.

9. The tire air pressure detecting device according to claim 6, wherein the determining means is for determining the tire air pressure state of the drive wheel based on the rotational state value calculated by the rotational state value calculating means when the timewise change amount of the rotational state value cannot be calculated.

10. The tire air pressure detecting device according to claim 1, wherein the determining means is for determining the air pressure state of the tire of the drive wheel based on the timewise change amount of the rotational state value which has been corrected by the correcting means when the resonance frequency of the drive wheel before the vehicle speed exceeds the upper limit value cannot be sampled.

11. The tire air pressure detecting device according to claim 10, wherein the determining means is for determining the tire air pressure state of the drive wheel based on the rotational state value calculated by the rotational state value calculating means when the timewise change amount of the rotational state value cannot be calculated.

12. The tire air pressure detecting device according to claim 1, wherein the determining means is for determining the tire air pressure state of the drive wheel based on the rotational state value calculated by the rotational state value calculating means when the timewise change amount of the rotational state value cannot be calculated.

13. A tire air pressure detecting device comprising:
wheel speed detecting means for detecting wheel speeds of respective wheels of one of a front wheel drive vehicle and a rear wheel drive vehicle;
rotational state value calculating means for calculating a rotational state value depending on a deviation between a wheel speed deviation between left and right front wheels and a wheel speed deviation between left and right rear wheels based on the wheel speeds detected by the wheel speed detecting means;
abnormality determining means for comparing a magnitude of the rotational state value with a previously set upper limit value, determining whether the wheel speed of a right side drive wheel or a left side driven wheel is faster or the wheel speed of a left side drive wheel or a right side driven wheel is faster from a degree of positiveness or negativeness of the rotational state value when the rotational state value exceeds the upper limit value, and specifying the two wheels determined to have faster wheel speeds to be the wheels having lowered tire air pressures;
wherein the abnormality determining means includes
front to rear wheel speed deviation calculating means for calculating a wheel speed deviation between the front and the rear wheels based on the wheel speeds detected by the wheel speed detecting means, and
regression calculating means for performing a regression calculation for regressing to a first order function the rotational state value calculated by the rotational state calculating means and the wheel speed deviation between the front and the rear wheels calculated by the front to rear wheel speed deviation calculating means, and determining a slope of the first order function as a slip state value representing a slip state of the wheel; and
the abnormality determining means is for determining as the driven wheel the wheel having the lowered tire air pressure in the two wheels when the slip state value is recognized to be 0 and determining as the drive wheel the wheel having the lowered tire air pressure in the two wheels when the slip state value is not recognized to be 0.

14. The tire air pressure detecting device according to claim 13, wherein the rotational state value used in the abnormality detecting means and the slip state value are correction values in consideration of the rotational state value and the slip state value at a reference time point as offset amounts.

15. A tire air pressure detecting device comprising:
wheel speed detecting means for detecting wheel speeds of respective wheels of a front wheel drive or a rear wheel drive vehicle;
rotational state calculating means for calculating a rotational state value depending on a deviation between a wheel speed deviation between left and right front wheels and a wheel speed deviation between left and right rear wheels based on the wheel speeds detected by the wheel speed detecting means;
abnormality determining means for comparing a magnitude of the rotational state value with a previously set upper limit value, determining whether the wheel speed of a right side drive wheel or a left side driven wheel is faster or the wheel speed of a left side drive wheel or a right side driven wheel is faster from a degree of positiveness or negativeness of the rotational state value when the rotational state value exceeds an upper limit value and specifying the two wheels determined to have faster wheel speeds as the wheels having lowered tire air pressures;
wherein the abnormality determining means includes
front to rear wheel speed deviation calculating means for calculating a wheel speed deviation between the front and the rear wheels based on the wheel speeds detected by the wheel speed detecting means,
regression calculating means for performing a regression calculation for regressing to a first order function the rotational state value calculated by the rotational state value calculating means and the wheel speed deviation between the front and the rear wheels calculated by the front to rear wheel speed deviation calculating means, and
rotational state value correcting means for correcting the rotational state value calculated by the rotational state value calculating means to a rotational state value at a reference value of the wheel speed deviation between the front and the rear wheels based on a result of the regression calculation by the regression calculating means; and the rotational state value in the abnormality determining means is determined to be the rotational state value corrected by the rotational state value correcting means.

16. The tire air pressure detecting device according to claim 15, wherein:

a slope of the first order function in the regression calculation means is determined to be a slip state value representing a slip state of the wheel;

the abnormality determining means is for determining as the driven wheel the wheel having the lowered tire air pressure in the two wheels when the slip state value is recognized to be 0 and for determining as the drive wheel the wheel having the lowered tire air pressure in the two wheels when the slip state value is not recognized to be 0.

* * * * *